(12) United States Patent
Matsuyuki

(10) Patent No.: US 11,574,471 B2
(45) Date of Patent: Feb. 7, 2023

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventor: Tomotaka Matsuyuki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/140,116

(22) Filed: Jan. 3, 2021

(65) Prior Publication Data
US 2021/0390304 A1    Dec. 16, 2021

(30) Foreign Application Priority Data

Jun. 12, 2020  (JP) ............................ JP2020-102347

(51) Int. Cl.
| | |
|---|---|
| *G06T 11/00* | (2006.01) |
| *G06V 20/20* | (2022.01) |
| *G06F 3/04842* | (2022.01) |
| *G06T 7/00* | (2017.01) |
| *G06Q 10/10* | (2012.01) |
| *G06Q 10/06* | (2012.01) |
| *G06Q 10/00* | (2012.01) |

(52) U.S. Cl.
CPC .......... *G06V 20/20* (2022.01); *G06F 3/04842* (2013.01); *G06Q 10/063114* (2013.01); *G06Q 10/103* (2013.01); *G06Q 10/20* (2013.01); *G06T 7/0002* (2013.01); *G06T 11/00* (2013.01)

(58) Field of Classification Search
CPC ............ G06K 9/00671; G06F 3/04842; G06Q 10/063114; G06Q 10/103; G06Q 10/20; G06T 7/0002; G06T 11/00
See application file for complete search history.

(56) References Cited

U.S. PATENT DOCUMENTS

| | | | |
|---|---|---|---|
| 8,606,611 B1* | 12/2013 | Fedorov ............... | G06Q 10/103 705/7.13 |
| 2014/0039954 A1* | 2/2014 | Wong ............. | G06Q 10/063118 705/7.17 |
| 2015/0221077 A1* | 8/2015 | Kawabata ............... | G06T 7/337 382/141 |

(Continued)

FOREIGN PATENT DOCUMENTS

| | | |
|---|---|---|
| JP | 2010-048842 | 3/2010 |
| JP | 2012-247821 | 12/2012 |

*Primary Examiner* — Yu Chen
(74) *Attorney, Agent, or Firm* — JCIPRNET

(57) ABSTRACT

An information processing device provided with a memory and one or multiple processors. The memory stores a map, information related to equipment installed in a region indicated by the map, and a person who is to work on the equipment in association with each other. The processor is configured to control a display device to display the map and an image of the equipment according to a user. In a case where the image is selected, the processor is configured to control the display device to display information related to work to be performed on the equipment in the image, and in a case where the work is finished, the processor is configured to request the user to take an image of an installed state of the equipment, and cause the memory to store the taken image.

15 Claims, 17 Drawing Sheets

(56) References Cited

U.S. PATENT DOCUMENTS

| | | | | |
|---|---|---|---|---|
| 2015/0295803 | A1* | 10/2015 | Jung | G06Q 10/20 709/224 |
| 2015/0310380 | A1* | 10/2015 | Acres | G07F 17/3234 705/7.16 |
| 2016/0132532 | A1* | 5/2016 | German | G06V 20/20 340/687 |
| 2016/0335731 | A1* | 11/2016 | Hall | G06Q 10/067 |
| 2018/0130260 | A1* | 5/2018 | Schmirler | G06F 3/011 |
| 2019/0236844 | A1* | 8/2019 | Balasian | G06Q 10/20 |
| 2019/0340819 | A1* | 11/2019 | Chandrashekarappa | G06F 3/04842 |
| 2020/0011696 | A1* | 1/2020 | Vijayakumari Mahasenan | G01C 21/3697 |
| 2020/0034622 | A1* | 1/2020 | Thakurta | G05B 15/02 |
| 2020/0151450 | A1* | 5/2020 | Hishinuma | G06T 7/74 |
| 2020/0293535 | A1* | 9/2020 | Davis | F24F 11/64 |
| 2021/0067595 | A1* | 3/2021 | Gum | H04L 67/18 |
| 2021/0073694 | A1* | 3/2021 | Yellin | G06Q 10/06313 |
| 2021/0255596 | A1* | 8/2021 | Torio | G05B 19/0426 |

\* cited by examiner

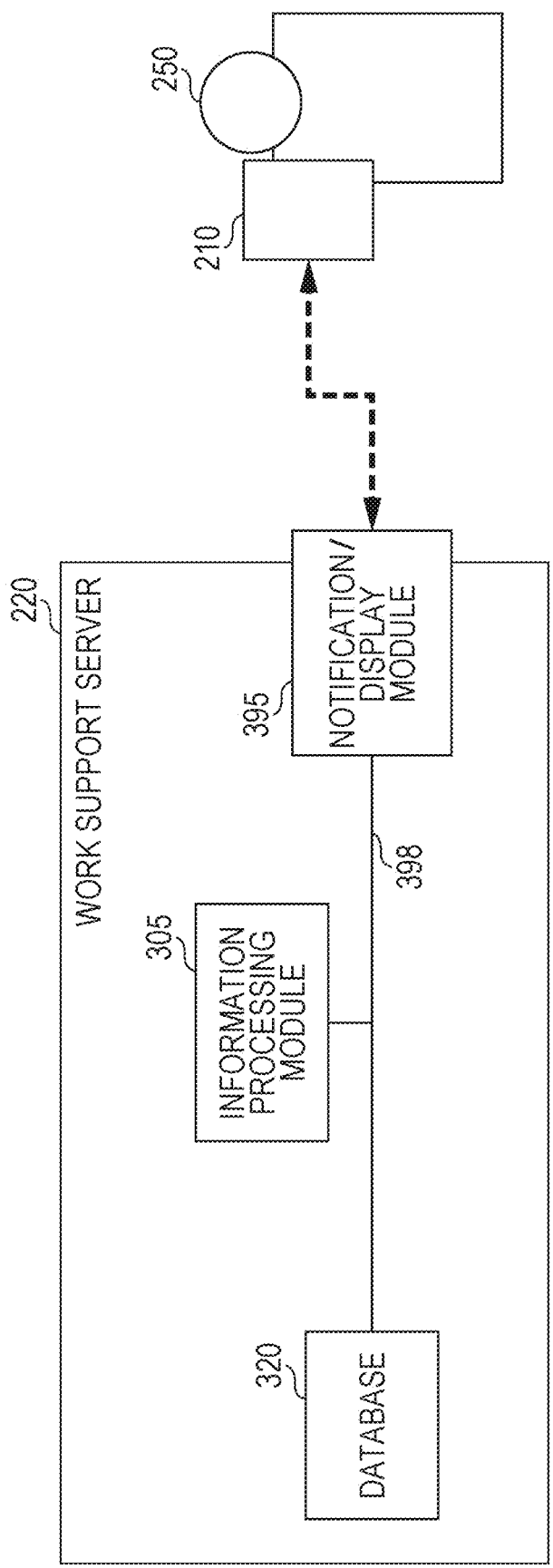

FIG. 5

| ID (505) | WORK TARGET EQUIPMENT NAME (510) | ACQUIRED DATA TYPE (515) | BUILDING WHERE INSTALLED (520) | DETAILED INSTALLATION LOCATION (525) | WORK DETAILS (530) | WORK DEADLINE (535) | WORKER (540) | OPERATING CONDITION (545) |
|---|---|---|---|---|---|---|---|---|
| 0001 | FX-0x21 | TEMPERATURE | AAA BUILDING, WAREHOUSE BBB | 3F ROOM #X, NORTH SIDE MAP | REGULAR INSPECTION | 2020/03/03 | A | GOOD |
| 0002 | FF-023MX | HUMAN | AAA BUILDING, WAREHOUSE BBB | 3F ROOM #X, NORTH SIDE MAP | REGULAR INSPECTION | 2020/03/03 | A | GOOD |
| 0003 | XX-2335 | POSITION | AAA BUILDING, WAREHOUSE BBB | 3F ROOM #X, NORTH SIDE MAP | REPLACE AGING DEVICE | 2020/04/01 | A | GOOD |
| 0004 | CC-333 | POWER | AAA BUILDING, WAREHOUSE BBB | 3F ROOM #X, NORTH SIDE MAP | REGULAR INSPECTION | 2022/03/30 | – | GOOD |
| ... | – | – | – | | | | | |

FIG. 6

| 605 | 610 | 615 | 620 | 625 |
|---|---|---|---|---|
| ID | WORK DATE AND TIME | WORKER | EQUIPMENT IMAGE BEFORE WORK | EQUIPMENT IMAGE AFTER WORK COMPLETION |
| 0001 | 2020/03/03 15:05 | A | 🗎 | 🗎 |
| 0002 | 2020/03/03 15:15 | A | 🗎 | 🗎 |
| ... | ... | ... | ... | ... |

| 630 | 635 | 640 | 645 |
|---|---|---|---|
| CONTENT OF WORK PERFORMED | COMPARISON RESULT BEFORE/AFTER WORK | EQUIPMENT IMAGE AFTER REINSTALLATION | DETAILED REINSTALLATION LOCATION |
| abcdef | DIFFERENT | - | 3F ROOM #X, NORTH SIDE MAP02 |
| ghijkl | DIFFERENT | 🗎 | - |
| ... | ... | ... | ... |

600

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-102347 filed Jun. 12, 2020.

BACKGROUND

(i) Technical Field

The present disclosure relates to an information processing device and a non-transitory computer readable medium.

(ii) Related Art

Japanese Unexamined Patent Application Publication No. 2010-048842 addresses the challenge of enabling a display device for building facility maintenance to update building information rapidly on a screen displaying a map. A display device for building facility maintenance include an information updater that updates original information stored in a building information storage unit in the case where building information related to the building is added or changed on the screen. According to this configuration, building information may be updated rapidly on the screen without using a separate system.

Japanese Unexamined Patent Application Publication No. 2012-247821 addresses the challenge of enabling a supervisor at an information center to grasp a delay of maintenance staff before a scheduled arrival time in a maintenance staff dispatch system. The information center includes a maintenance staff position information detection unit that detects position information about the maintenance staff from a mobile terminal using GPS, and a storage unit that stores position information about a building, movement information about the maintenance staff, and the scheduled arrival time. Furthermore, the information center includes: a time determination unit that determines that a predetermined time before the scheduled arrival time has been reached; a delay determination unit that, when the predetermined time is reached, determines whether or not the maintenance staff will be delayed past the scheduled arrival time on the basis of the predetermined time, the position information about the maintenance staff and the building, and the movement information about the maintenance staff; and a notification unit that notifies the supervisor in the case where the delay determination unit determines that the maintenance staff will be delayed.

SUMMARY

When performing work on equipment, if all installed equipment is displayed, equipment other than the equipment that a user is to work on will be displayed, which may cause the user to mistakenly work on the wrong equipment. Accordingly, aspects of non-limiting embodiments of the present disclosure relate to reducing the chance that the user will mistakenly work on the wrong equipment compared to the case where all installed equipment is displayed.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device provided with a memory and one or multiple processors. The memory stores a map, information related to equipment installed in a region indicated by the map, and a person who is to work on the equipment in association with each other. The processor is configured to control a display device to display the map and an image of the equipment according to a user. In a case where the image is selected, the processor is configured to control the display device to display information related to work to be performed on the equipment in the image, and in a case where the work is finished, the processor is configured to request the user to take an image of an installed state of the equipment, and cause the memory to store the taken image.

BRIEF DESCRIPTION OF THE DRAWINGS

An exemplary embodiment of the present disclosure will be described in detail based on the following figures, wherein:

FIG. 3 is another schematic module configuration diagram for an exemplary configuration according to the exemplary embodiment;

FIG. 5 is an explanatory diagram illustrating an exemplary data structure of a work target information table;

FIG. 6 is an explanatory diagram illustrating an exemplary data structure of a work information table;

DETAILED DESCRIPTION

Hereinafter, an exemplary embodiment related to achieving the present disclosure will be described on the basis of the drawings.

Figure 1:
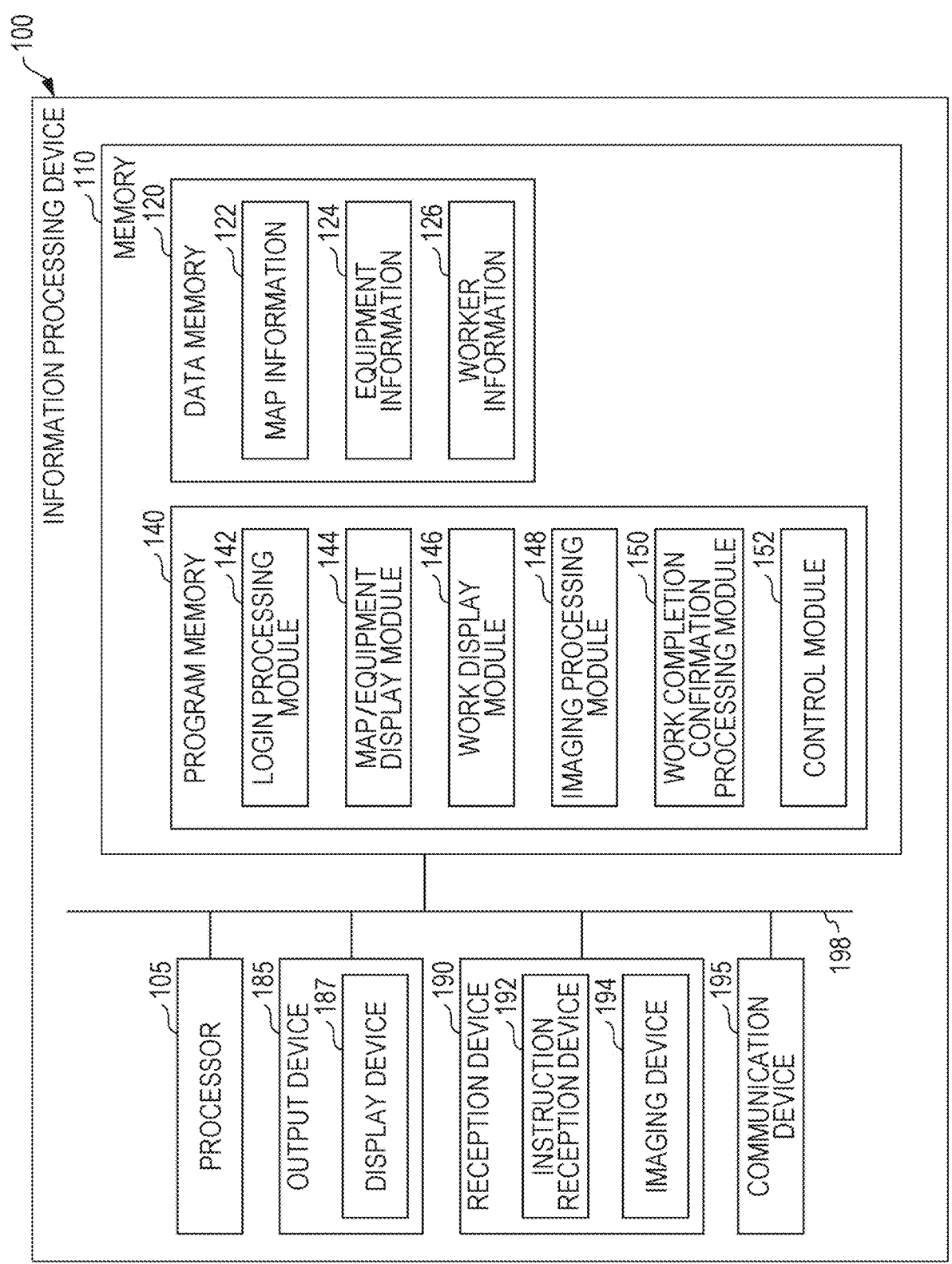
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs are included as an interpretation of "software") and hardware which are typically capable of being logically separated. Consequently, the term module in the exemplary embodiment not only refers to modules in a computer program, but also to modules in a hardware configuration. Therefore, the exemplary embodiment also serves as a description of a computer program (for example, a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data, instructions, referential relationships between data, and logins, for example) in addition to physical connections. The term "predetermined" refers to something being determined prior to the processing being referred to, and obviously denotes something that is determined before a process according to the exemplary embodiment starts, but may also denote something that is determined after a process according to the exemplary embodiment has started but before the processing being referred to, in accordance with conditions or states at that time, or in accordance with conditions or states up to that time. In the case of multiple "predetermined values", the predetermined values may be respectively different values, or two or more values ("two or more values" obviously also includes the case of all values) which are the same. Additionally, statements like "B is performed in the case of A" are used to denote that a determination is made regarding whether or not A holds true, and B is performed in the case where it is determined that A holds true. However, this excludes cases where the determination of whether or not A holds true may be omitted. Also, in the case of listing things, like "A, B, C" and so on, the listing is an illustrative example unless specifically noted otherwise, and includes the case of choosing only one among the listing (for example, A only).

Also, the terms "system" and "device" not only encompass configurations in which multiple computers, hardware, or devices are connected by a communication medium such as a network (where "network" includes connections that support 1-to-1 communication), but also encompass configurations realized by a single computer, hardware, or device. The terms "device" and "system" are used interchangeably. Obviously, the term "system" does not include merely artificially arranged social constructs (in other words, social systems).

Also, every time a process is performed by each module or every time multiple processes are performed within a module, information to be processed is retrieved from a storage device, and the processing results are written back to the storage device after the processing. Consequently, description of the retrieval from a storage device before processing and the writing back to a storage device after processing may be reduced or omitted in some cases.

An information processing device 100 according to the exemplary embodiment includes a function of supporting work on equipment by a user. As illustrated in the example of FIG. 1, the information processing device 100 at least includes a processor 105 and memory 110, which are connected by a bus 198 to exchange data. In addition, the information processing device 100 may also include an output device 185, a reception device 190, and a communication device 195. Also, data is exchanged among the processor 105, the memory 110, the output device 185, the reception device 190, and the communication device 195 through the bus 198.

Particularly, the information processing device 100 performs a process related to a user interface for navigating work on equipment.

Here, the term "equipment" refers to one or more apparatuses installed indoors or outdoors. After the equipment is installed, it may be necessary for a user (typically referred to as a worker, administrator, or the like) to perform work on the equipment. Examples of the equipment include Internet of Things (IoT) equipment such as sensors, office equipment such as multi-function devices, and home appliances. Examples of sensors include sensors that measure environmental properties such as temperature, humidity, barometric pressure, illuminance, human presence, noise, and $CO_2$ concentration, and also sensors that measure the motions of objects, such as shock, vibration, inclination, tipping over, falling, opening or closing, and displacement. Examples of installation locations include offices, hospitals, factories, gymnasiums, construction sites, and farms.

Here, the term "work" refers two types of work, namely, confirmation work to confirm that the equipment is installed, and work for maintaining the equipment. The former type of work is performed in the case where the equipment is running normally but the target equipment has been displaced or is positioned incorrectly, and also considers the possibility that accurate data is not being obtained. Confirmation work is work for which a determination may be made by external appearance alone, and includes checking that the equipment is installed, checking the position of the installation, and checking installation conditions such as the angle of the equipment, for example. The latter type of work is work performed so that the equipment operates correctly, and includes using a tool or the like to check that the equipment is operating correctly, adjusting the equipment, repairing the equipment, and replacing a component of the equipment or the entire piece of equipment, for example.

Note that the block diagram illustrated in the example of FIG. 1 also illustrates an exemplary hardware configuration of a computer that achieves the exemplary embodiment. A hardware configuration of a computer executing a program that acts as the exemplary embodiment is a computer like the one illustrated in the example of FIG. 1, and specifically is a computer or the like that may act as a personal computer or a server. The information processing device 100 uses the processor 105 as a processing unit and the memory 110 as a storage device. Specific examples of the information processing device 100 include a terminal carried by the user, and a server or the cloud capable of transmitting information to a terminal carried by the user. Also, a display device 187 corresponds to a display of the terminal carried by the user.

The processor 105 may be a single processor or multiple processors. Examples of the processor 105 include a central processing unit (CPU) and a microprocessor. In the case of using multiple processors 105, the processor 105 may be a tightly coupled multiprocessor system or a loosely coupled multiprocessor system. For example, a single processor 105 may have multiple processor cores. Furthermore, multiple computers may be connected through a communication channel to configure a system that acts like a single computer virtually. A specific example of such a configuration is a loosely coupled multiprocessor system, which may be configured as a cluster system or a computer cluster. The processor 105 executes programs in program memory 140.

The memory 110 may include semiconductor memory internal to the processor 105, such as a register and cache memory, main memory such as random access memory (RAM) and read-only memory (ROM), a storage device that functions as a persistent storage device such as an internal storage device like a hard disk drive (HDD) or a solid-state drive (SSD), or an external or auxiliary storage device like a CD, DVD, or Blu-ray (registered trademark) Disc, USB memory, or a memory card, and a storage device such as a server connected through a communication channel.

The memory 110 includes data memory 120 that stores mostly data and program memory 140 that stores mostly programs. Note that besides the information and programs of modules illustrated in the diagram, the data memory 120 and the program memory 140 may also store a program such as an operating system (OS) for booting the computer and data such as parameters that change appropriately during the execution of the modules.

The output device 185 includes components such as the display device 187, for example. The display device 187 is a liquid crystal display, an organic electroluminescence (EL) display, a three-dimensional (3D) display, or the like, and displays information such as the results of processing by the processor 105 and data in the data memory 120 as text and image information, for example. Additionally, the output device 185 may also include components such as a speaker and an actuator that causes the information processing device 100 to vibrate.

The reception device 190 includes components such as an instruction reception device 192 and an imaging device 194, for example. The instruction reception device 192 includes components such as a keyboard, a mouse, a microphone, and a camera (including an eye tracking camera or the like), and receives data based on operations performed on the components by the user (including operations performed using gestures, speech, and line of sight, for example).

Additionally, a device having the functions of both the display device 187 and the instruction reception device 192, such as a touchscreen, may be provided. In this case, the functions of a keyboard may be achieved by drawing a keyboard on the touchscreen with software (also called a software keyboard, an on-screen keyboard, or the like), even if physical keys do not exist.

Note that the display device 187 and the instruction reception device 192 are used mostly as a user interface.

The imaging device 194, such as a camera, takes an image of equipment and receives generated image data.

The communication device 195 is a communication channel interface such as a network card for connecting to other devices through a communication channel.

Regarding the portion of the exemplary embodiment that is achieved by a computer program, the computer program is loaded as software into the program memory 140 of the hardware configuration, and the software cooperates with hardware resources to achieve the exemplary embodiment.

Note that the hardware configuration illustrated in FIG. 1 illustrates a single exemplary configuration, and that the exemplary embodiment is not limited to the configuration illustrated in FIG. 1 insofar as the configuration still enables execution of the modules described in the exemplary embodiment. For example, a graphics processing unit (GPU, also including general-purpose computing on graphics processing units (GPGPU)) may also be used as the processor 105. Some modules may also be executed by special-purpose hardware (such as an application-specific integrated circuit (ASIC) as a specific example) or a reconfigurable integrated circuit (such as a field-programmable gate array (FPGA) as a specific example). Some modules may be configured to reside within an external system and be connected via a communication channel. Furthermore, it may also be configured such that multiple instances of the system illustrated in FIG. 1 are connected to each other by a communication channel and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device (that is, an image processing device having two or more from among scanning, printing, copying, and faxing functions).

The processor 105 is connected to the memory 110, the output device 185, the reception device 190, and the communication device 195 through the bus 198. The processor 105 executes processes according to a computer program stating an execution sequence for each module stored as programs in the program memory 140. For example, when triggered by the instruction reception device 192 receiving a user operation, a process according to the module corresponding to the operation in the program memory 140 is executed, and the processing result may be stored in the data memory 120, output to the display device 187, or transmitted to another device by controlling the communication device 195.

The memory 110 includes the data memory 120 and the program memory 140, and is connected to the processor 105, the output device 185, the reception device 190, and the communication device 195 through the bus 198.

The data memory 120 stores map information 122, equipment information 124, and worker information 126. The data memory 120 stores the following in association with each other: (1) a map, (2) information related to equipment installed in a region indicated by the map, and (3) a person who is to work on the equipment. For example, the data memory 120 stores a work target information table 500 described later using FIG. 5.

The map information 122 is information about a map including one or more locations where equipment is installed. The map may be an indoor map of a building, or an outdoor map. Such a map is particularly useful for an indoor environment where GPS is unavailable, or in the case where the level of GPS precision makes it difficult to understand where equipment is installed. Specifically, the map is a map of the interior of a building, a map of each floor of a building, or a map of each room in a building, for example. The data format of the map may be a bitmap image such as a binary image or a color image, or a vector image.

The equipment information 124 is information related to equipment installed in a region indicated by the map stored in the map information 122. Examples of the information related to equipment include information that specifies the equipment, information indicating the position where the equipment is installed (including an image of the installed equipment, for example), and information indicating the work to performed on the equipment. For example, the information related to equipment may be the work target information table 500, a work information table 600, and an installation position strictness table 700 described later using FIGS. 5, 6, and 7.

The worker information 126 is information related to a person who works on equipment. Examples of information related to a person who works on equipment include information that specifies the person who performs the work, information used to authenticate the person, a technical field that the person specializes in, information indicating the person's qualifications (or the models of equipment that the person is able to work on, for example), and information about the person's schedule.

The program memory 140 stores a login processing module 142, a map/equipment display module 144, a work display module 146, an imaging processing module 148, a work completion confirmation processing module 150, and a control module 152.

The login processing module 142 authenticates a person who uses the information processing device 100. An authenticated person is an authorized worker. The login processing module 142 confirms that the user is registered with the service provided by the information processing device 100 (that is, performs a login process). For example, the login processing module 142 may be configured such that a keyboard or the like is operated by the user, information such as a user identification (ID) and a password is received, and the received information is checked against information registered in advance. Alternatively, the login processing module 142 may be configured to use a device such as an IC card reader to read an IC card carried by the user, and check information stored in the IC card. Otherwise, the login processing module 142 may also be configured to use biometric authentication such as face recognition or fingerprint authentication.

The map/equipment display module 144 controls the display device 187 to display an image of equipment according to the map and the user.

Additionally, an icon indicating equipment treated as a target may be displayed on the displayed map at the position where the equipment is installed.

The equipment may be any type of equipment on which work is performed, such as cameras, Internet of Things (IoT) equipment such as various sensors, and office equipment such as multi-function devices.

The "equipment according to the map and the user" refers to equipment installed in a region indicated by the map and which the user is to work on.

Also, the map/equipment display module 144 may be configured to differentiate the display appearance of an image of equipment corresponding to a user from the display appearance of an image of equipment not corresponding to the user.

Here, the "equipment corresponding to the user" refers to equipment that the user is responsible for working on. The "equipment not corresponding to the user" refers to equipment that the user is not responsible for working on.

Also, "differentiating the display appearance" means, for example, (1) displaying only the image of the equipment corresponding to the user and not displaying the image of the equipment not corresponding to the user, (2) displaying the image of the equipment corresponding to the user in a relatively large size while displaying the image of the equipment not corresponding to the user in a relatively small size, (3) displaying the image of the equipment corresponding to the user in a main screen or window while displaying the image of the equipment not corresponding to the user elsewhere than the main screen or window (such as a sub-screen or sub-window transitioning from the main screen or window, for example), or the like.

Additionally, the map/equipment display module 144 may also be configured to differentiate the display appearance of an image of equipment targeted for work currently from the display appearance of an image of equipment not targeted for work currently.

Here, the "equipment targeted for work" means that the equipment is currently scheduled to be worked on. Note that the equipment being targeted for work is independent of whether or not the user is responsible for performing the work. However, a condition may also be set such that the equipment is targeted for work currently and the user is also the person responsible for performing the work. The other "equipment not targeted for work" refers to equipment that is installed in the region of the map being displayed, but is equipment other than the "equipment targeted for work", or in other words, equipment that is not currently scheduled to be worked on.

Also, "differentiating the display appearance" means, for example, (1) displaying only the image of the equipment targeted for work and not displaying the image of the equipment not targeted for work, (2) displaying the image of the equipment targeted for work in a relatively large size while displaying the image of the equipment not targeted for work in a relatively small size, (3) displaying the image of the equipment targeted for work in a main screen or window while displaying the image of the equipment not targeted for work elsewhere than the main screen or window (such as a sub-screen or sub-window transitioning from the main screen or window, for example), or the like.

Additionally, the map/equipment display module 144 may also be configured to differentiate the display appearance of an image of equipment targeted for confirmation work from the display appearance of an image of equipment not targeted for confirmation work. Note that, as described above, there are two types of work, namely confirmation work to confirm that the equipment is installed, and maintenance work for maintaining the equipment.

Here, "differentiating the display appearance" means, for example, (1) displaying only the image of the equipment targeted for maintenance work and not displaying the image of the equipment targeted for confirmation work, (2) displaying the image of the equipment targeted for maintenance work in a relatively large size while displaying the image of the equipment targeted for confirmation work in a relatively small size, (3) displaying the image of the equipment targeted for maintenance work in a main screen or window while displaying the image of the equipment targeted for confirmation work elsewhere than the main screen or window (such as a sub-screen or sub-window transitioning from the main screen or window, for example), or the like.

In the case where an image of equipment displayed by the map/equipment display module 144 is selected, the work display module 146 controls the display device 187 to display information related to the work to perform on the equipment in the selected image.

Here, the "work to perform on the equipment" means confirming that the equipment is installed, and maintenance work. Note that maintenance work includes actions such as checking that the equipment is running normally, repairing the equipment, adjusting the equipment, replacing a component of the equipment, and replacing the entire piece of equipment.

The "information related to the work" is information indicating details about the work that the user is to perform, and may be text information, graphical information, image information, audio information, and video information, for example.

In the case where the user has finished the work and performs an imaging operation such as activating a shutter button, the imaging processing module 148 controls the imaging device 194 to acquire an image. Obviously, the subject of the image is the equipment on which work has been completed.

When the work is finished, the work completion confirmation processing module 150 requests the user to take an image of the installed state of the equipment, and stores the taken image in the data memory 120.

Here, the work being "finished" may be detected by a user operation such as the user selecting a "Finish" button indicating that the work is finished, or the end of the maintenance may be detected by a sensor in the equipment itself, a message indicating that the maintenance is finished may be transmitted to the information processing device 100, and the information processing device 100 may detect that the work is finished by receiving the message.

Also, "requesting the user to take an image of the installed state of the equipment" specifically may be presenting a display instructing the user to take an image with the camera or displaying a camera icon and enabling imaging when the "Finish" button is selected by the user.

Also, the work completion confirmation processing module 150 may compare an image taken before the work is performed by the user to an image taken after the work is performed, and in the case where the work is incomplete, request the user to install the target equipment again, request the user to take an image of the reinstalled equipment, and store the taken image in the data memory 120.

Here, the "image taken before the work is performed by the user" (designated the image A) is an image that has been stored in the data memory 120 since before the work is performed, while the "image taken after the work is performed" (designated the image B) is the image taken by the user after the work is finished.

The work being "incomplete" means that the installation conditions of the equipment are different compared to the equipment before the work was performed. For example, differences between the image A and the image B are extracted, and if the installation position is different by a predetermined threshold or more, if the angle is different by a predetermined threshold or more, or the like, the work is determined to be incomplete. Artificial intelligence may also be used to make the determination. In other words, machine learning may be performed by using the combination of the image A, the image B, and information indicating whether work is complete or incomplete as training data. For example, a machine learning method such as a decision tree, a Naive Bayes model, a decision list, a support vector machine, a maximum entropy approach, a conditional random field, a convolutional neural network, or a recurrent neural network may be used. Artificial intelligence generated in the training phase may be used to predict whether the work is complete or incomplete by treating the images A and B as inputs.

Furthermore, in the case where the equipment is a predetermined type of equipment and the work is incomplete (the work here mostly referring to equipment installation work), the work completion confirmation processing module 150 may be configured to request the user to install the equipment again.

Here, the "predetermined type" corresponds to a type of equipment for which strictness of the installation position of the target equipment is demanded. For example, the predetermined type may be a human sensor or a sensor for detecting the opening and closing of a door. For example, the predetermined type is defined using the installation position strictness table 700 illustrated in the example of FIG. 7 described later.

Next, in the case where the equipment is not the predetermined type of equipment and the installation position of the equipment has changed to a different position, the work completion confirmation processing module 150 may be configured to request the user to indicate the position where the equipment is installed on the map.

Here, the "case where the equipment is not the predetermined type of equipment" corresponds to a type of equipment for which strictness of the installation position is not demanded, and includes types such as a temperature sensor, a humidity sensor, and a weight sensor, for example. This is because these types of equipment still function correctly even if the installation position is changed to a different position. However, because the installation position has changed, the user indicates the position where the equipment is installed on the map so that the equipment will be displayed at the new installation position when displaying the position of the equipment on the map in the future. In other words, even if the installation position is changed, the latest installation position is reflected on the map.

The control module 152 controls the login processing module 142, the map/equipment display module 144, the work display module 146, the imaging processing module 148, and the work completion confirmation processing module 150 to support the user who works on the equipment.

Figure 2A:
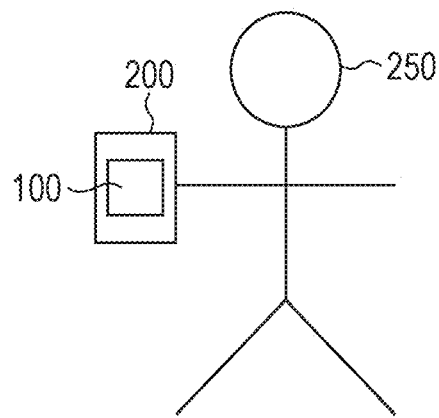
FIG. 2A is an explanatory diagram illustrating an exemplary system configuration utilizing the exemplary embodiment.
Figure 2B:
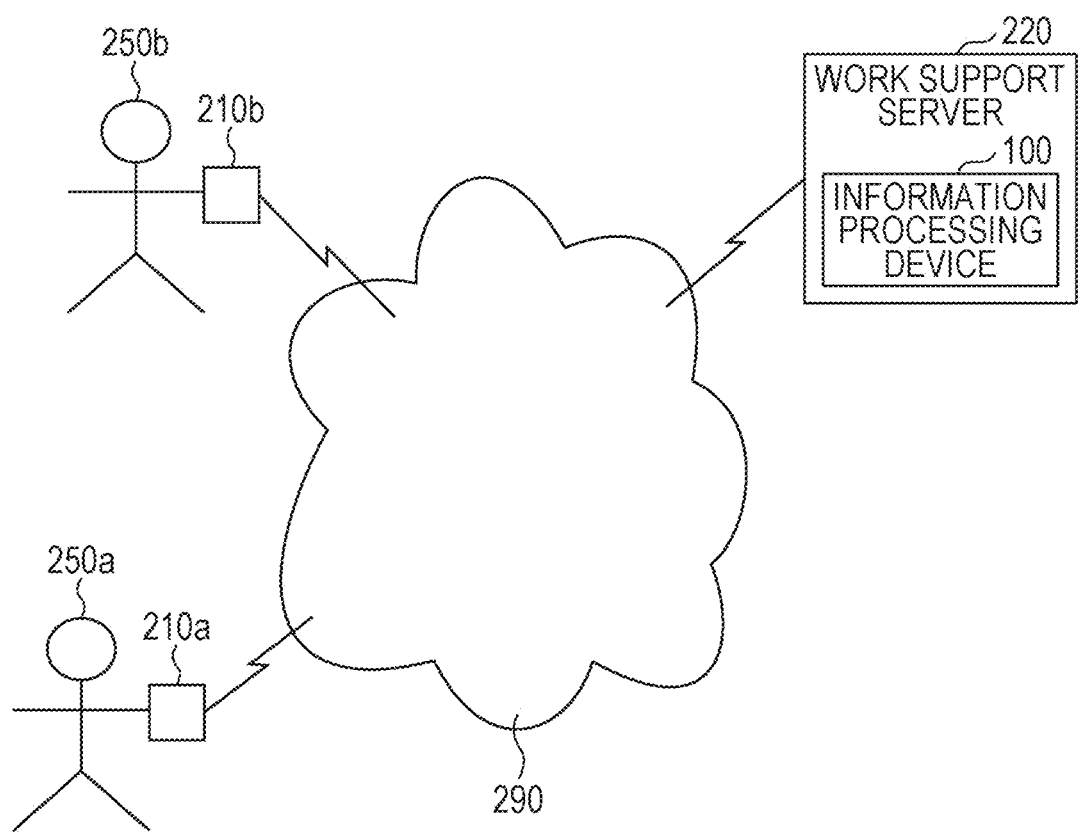
FIG. 2B is an explanatory diagram illustrating an exemplary system configuration utilizing the exemplary embodiment.

FIGS. 2A and 2B are explanatory diagrams illustrating exemplary system configurations utilizing the exemplary embodiment.

The example in FIG. 2A illustrates a standalone system configuration.

A worker 250 carries a user terminal 200. The information processing device 100 is built into the user terminal 200. For example, the user terminal 200 is a tablet provided with a camera and a touchscreen that detects contact with a finger or pen, displays information such as a map, an image of equipment, and a work procedure, and takes an image of the installation state of the equipment after the work is performed. Note that the worker 250 is one example of the user of the information processing device 100. The worker 250 uses the user terminal 200 to work on the equipment at a specified position.

The example in FIG. 2B illustrates a networked system configuration.

Each worker 250 carries a user terminal 210. The information processing device 100 is built into a work support server 220. For example, the user terminal 210 is a tablet provided with communication functions, a camera, and a touchscreen that detects contact with a finger or pen, communicates with the work support server 220, displays information such as a map, an image of equipment, and a work procedure, and takes an image of the installation state of the equipment after the work is performed. The work support server 220 performs most of the information processing, while the user terminal 210 mostly functions as a user interface.

The user terminal 210a, the user terminal 210b, and the work support server 220 are interconnected through a communication channel 290.

The information processing device 100 in this case generally includes the processor 105, the memory 110, the communication device 195, and the bus 198, and communicates with each user terminal 210 through the communication device 195 to give instructions and the like to each worker 250 and also receive information such as the results of the work performed by each worker 250.

Each user terminal 210 includes the functions of the output device 185, the reception device 190, and the communication device 195 of the information processing device 100, and communicates through the communication device 195 to receive instructions and the like from the work support server 220 and also transmit information such as the results of the work performed by each worker 250 to the work support server 220. Each worker 250 uses the user terminal 210 to work on the equipment at a specified position.

FIG. 3 is another schematic module configuration diagram for an exemplary configuration according to the exemplary embodiment.

The internal configuration of the work support server 220 illustrated in the example of FIG. 2B may be considered to be like the example of FIG. 3. In other words, the work support server 220 includes a database 230 that corresponds to the data memory 120, an information processing module 305 that corresponds to the processor 105 that executes programs in the program memory 140, and a notification/display module 395 that corresponds to the module(s) related to notification and display with respect to the user terminal 210 in the program memory 140.

The information processing module 305, the database 320, and the notification/display module 395 are interconnected through a bus 398.

The user terminal 210 communicates with the work support server 220, and displays the map, image of equipment, and work procedure transmitted from the work support server 220. The worker 250 performs the work, takes an image of the equipment after the work, and the user terminal 210 transmits the image to the work support server 220. Additionally, the work support server 220 compares the image taken before the work and the image taken after the work, determines whether or not to reinstall, and transmits an instruction to the worker 250. Also, in the case where the installation position is different but tolerated, the worker 250 is instructed to indicate the new installation position on the map.

Figure 4A:
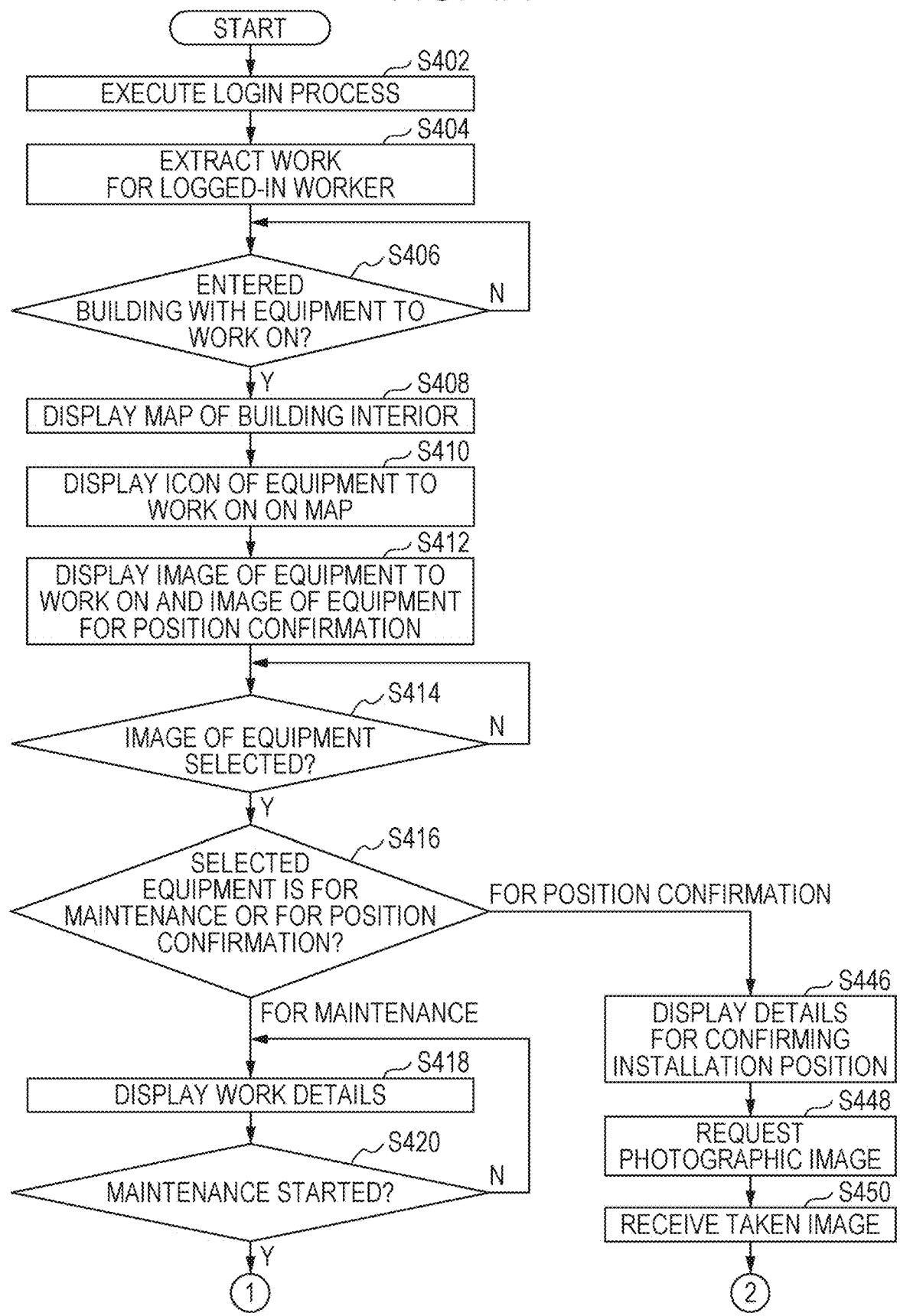
FIG. 4A is a flowchart illustrating an exemplary process according to the exemplary embodiment.
Figure 4B:
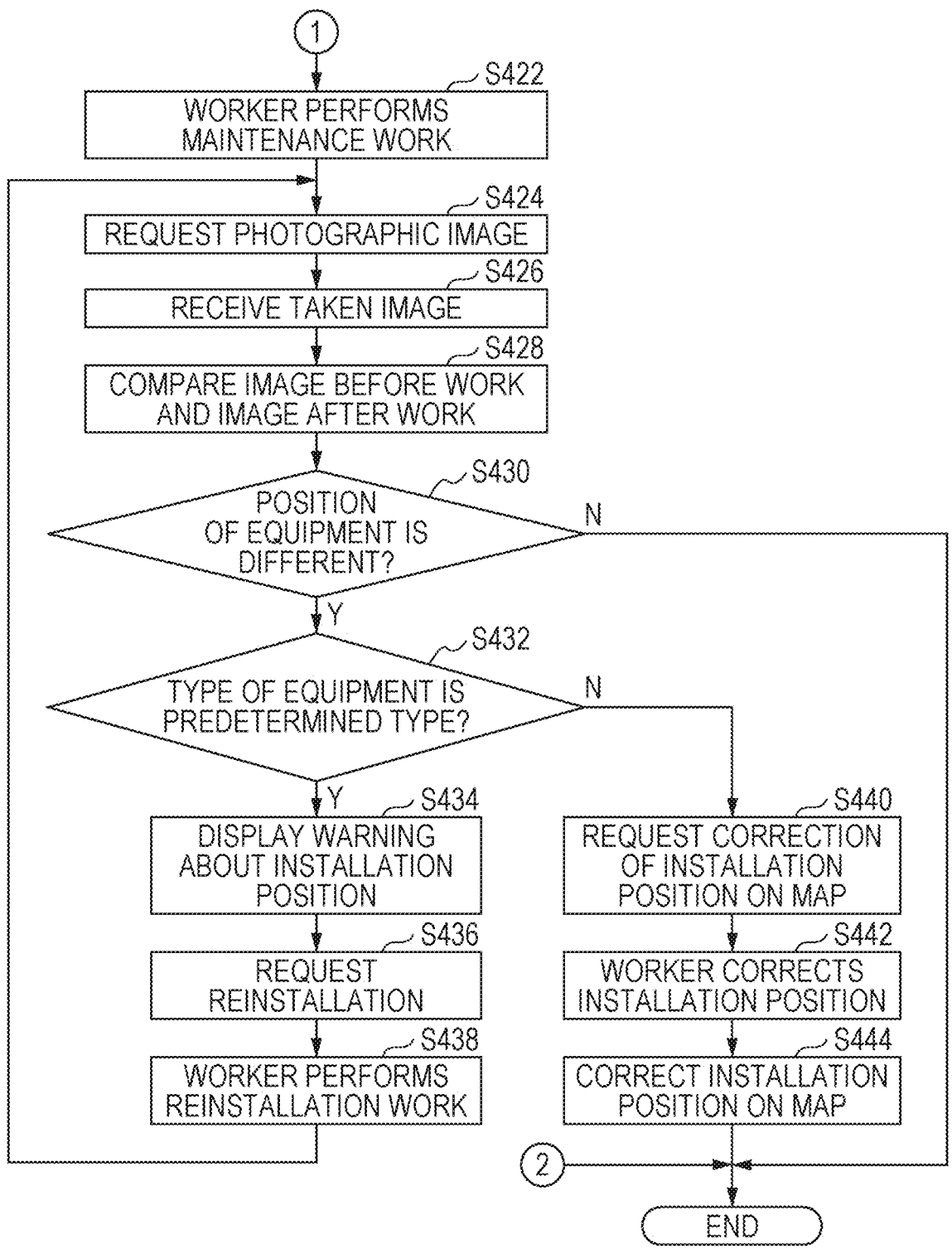
FIG. 4B is a flowchart illustrating an exemplary process according to the exemplary embodiment.

FIGS. 4A and 4B are flowcharts illustrating an exemplary process according to the exemplary embodiment.

In step S402, a login process is performed. The worker 250 logged in to the information processing device 100 is specified.

In step S404, work corresponding to the logged-in worker 250 is extracted. For example, work assigned to the worker 250 is extracted from the work target information table 500 described later. Note that work may also be extracted to match the current date and time (which may be the year, month, day, hour, minute, second, fraction of a second, or some combination thereof). For example, work that is before a corresponding deadline may be extracted while work that is past the corresponding deadline is not extracted, or the work whose corresponding deadline is one week away or less may be extracted. Any work that does not fall on the scheduled day of may also not be extracted. With this arrangement, equipment that is not targeted for work is not displayed on the map. In other words, to deter the theft of equipment, only equipment that the worker 250 is permitted to work on may be displayed.

In step S406, the worker 250 determines whether or not the worker 250 has entered the building housing the equipment to work on, and if so, the flow proceeds to step S408. Otherwise, the flow stands by until the worker 250 enters the building.

In step S408, a map of the building interior is displayed.

In step S410, an icon of the equipment to work on is displayed on the map.

In step S412, an image of the equipment to work on and an image of the equipment for position confirmation are displayed.

In step S414, it is determined whether or not an image of equipment has been selected by the worker 250, and if so, the flow proceeds to step S416. Otherwise, the flow stands by until the worker 250 selects an image of equipment.

In step S416, it is determined whether the selected equipment is equipment targeted for maintenance or equipment targeted for position confirmation. In the "for maintenance" case, the flow proceeds to step S418, whereas in the "for position confirmation" case, the flow proceeds to step S446.

In step S418, details about the work to be performed on the equipment are displayed.

In step S420, it is determined whether or not maintenance has started, and if so, the flow proceeds to step S422. Otherwise, the flow returns to step S418. For example, the case where a button indicating the start of maintenance is selected by the worker 250 corresponds to the "case where maintenance has started".

In step S422, maintenance work is performed by the worker 250.

In step S424, the worker 250 is requested to take a photograph of the equipment after the maintenance work is performed. The "request to take a photograph" may be triggered at any time after the worker 250 has performed the maintenance work, or in the case where a button indicating maintenance completion is selected, for example.

In step S426, the taken image is received.

In step S428, the image taken before the work and the image taken after the work are compared. The "image taken before the work" is an image taken before the worker 250 performed the work, and may be the image of the equipment selected in step S414, for example. The "image taken after the work" is the image taken in step S424 (that is, the image received in step S426). The comparison process at this point may use artificial intelligence as described above.

In step S430, it is determined whether or not the position of the equipment is different, and if so, the flow proceeds to step S432. Otherwise, the process ends (step S499). Here, "different" indicates that the work is incomplete, and "otherwise" indicates that the work is complete.

In step S432, it is determined whether or not the equipment is a predetermined type of equipment, and if so, the flow proceeds to step S434. Otherwise, the flow proceeds to step S440. Here, the "predetermined type" corresponds to a type of equipment for which strictness of the installation position is demanded, as described above. For example, whether or not strictness of the installation position is demanded for the target equipment may be determined from the installation position strictness table 700 described later.

In step S434, a warning about the installation position is displayed. Because strictness of the installation position is demanded for the equipment, an explanation regarding the installation position is displayed.

In step S436, the worker 250 is requested to reinstall the target equipment.

In step S438, the worker 250 performs the work of reinstalling the equipment, and the flow returns to step S424. The process is repeated until the equipment is in the same installation position as the "image taken before the work".

In step S440, the worker 250 is requested to correct the installation position on the map. Because strictness of the installation position is not demanded for the equipment, the current installation position is accepted. However, because the installation position on the map has changed, the worker 250 is made to indicate the changed installation position on the map for work in the future. Thereafter, the position of the icon of the equipment displayed in step S410 is the changed installation position.

In step S442, the worker 250 corrects the installation position.

In step S444, the installation position on the map is corrected, and the process ends (step S499).

In step S446, details for confirming the installation position of the target equipment are displayed.

In step S448, the worker 250 is requested to take a photograph.

In step S450, the taken image is received, and the process ends (step S499). In this flowchart, the installation position is simply confirmed, but the process may also be configured to proceed to step S428. In other words, if the target equipment is equipment for which strictness of the installation position is demanded, the worker 250 is requested to reinstall the equipment, whereas if the target equipment is equipment for which strictness of the installation position is not demanded, the worker 250 is requested to correct the installation position on the map.

FIG. 5 is an explanatory diagram illustrating an exemplary data structure of the work target information table 500. The work target information table 500 may be used to extract information such as the work assigned to the logged-in worker 250, a map illustrating a region (such as a room or a hallway, for example) where the target equipment is installed, the position of the equipment on the map, and work details.

The work target information table 500 includes an ID field 505, a work target equipment name field 510, an acquired data type field 515, a building-where-installed field 520, a detailed installation location field 525, a work details field 530, a work deadline field 535, a worker field 540, and an operating condition field 545. The ID field 505 stores information (an ID) for uniquely identifying a unit of work in the exemplary embodiment. The work target equipment name field 510 stores the equipment name of the work target corresponding to the ID. The acquired data type field 515 stores the type of data acquired by the equipment. The building-where-installed field 520 stores the building where the equipment of the work target is installed. The building-where-installed field 520 may also store a map of the building, a map of each floor of the building, or a map of each room in the building. The detailed installation location field 525 stores details about the installation location. The detailed installation location field 525 may also store coordinates on the map stored in the building-where-installed field 520 as the installation location of the equipment. Additionally, the detailed installation location field 525 may also store an image of the installed state of the equipment. The image of the equipment is an image that was taken the previous time work was performed. Obviously, when work is performed for the first time, an image taken after the equipment is installed initially may be used. The work details field 530 stores details about the work. The work deadline field 535 stores a time limit (deadline) by which the work is to be performed. The worker field 540 stores the worker who is to work on the equipment. Note that the worker in the worker field 540 is set (assigned) if the deadline is within a predetermined period. The worker set in the worker field 540 may be selected with consideration for the type of equipment, for example. Specifically, a worker who specializes in the technical field for the equipment, holds qualifications for handling the equipment, and the like may be selected. In addition, schedule information about each worker may be used to select a worker who is able to perform the work by the deadline. The operating condition field 545 stores the operating condition of the equipment. In the case where communication with the equipment is available, a result determined from the content of communication with the equipment is stored as the operating condition. In the case where communication with the equipment is unavailable, the operating condition of the equipment at the time of the previous work is stored.

For example, on the first row of the work target information table 500, the ID is "0001", the work target equipment name is "FX-0x21", the acquired data type is "temperature", the building where the equipment is installed is "AAA Building, Warehouse BBB", the detailed installation location is "3F Room #X, north side", the maintenance work details are "regular inspection", the maintenance work deadline is "2020/03/03", the maintenance worker is "A", and the operating condition is "good". On the second row, the ID is "0002", the work target equipment name is "FF-0x23MX", the acquired data type is "human", the building where the equipment is installed is "AAA Building, Warehouse BBB", the detailed installation location is "3F Room #X, north side", the maintenance work details are "regular inspection", the maintenance work deadline is "2020/03/03", the maintenance worker is "A", and the operating condition is "good". On the third row, the ID is "0003", the work target equipment name is "XX-2335", the acquired data type is "position", the building where the equipment is installed is "AAA Building, Warehouse BBB", the detailed installation location is "3F Room #X, north side", the maintenance work details are "replace aging device", the maintenance work deadline is "2020/04/01", the maintenance worker is "A", and the operating condition is "good". On the fourth row, the ID is "0004", the work target equipment name is "CC-333", the acquired data type is "power", the building where the equipment is installed is "AAA Building, Warehouse BBB", the detailed installation location is "3F Room #X, north side", the maintenance work details are "regular inspection", the maintenance work deadline is "2020/03/30", the maintenance worker is "-", and the operating condition is "good".

FIG. 6 is an explanatory diagram illustrating an exemplary data structure of the work information table 600. The work information table 600 is generated when work is completed. Specifically, the work information table 600 is generated after step S444 in the case where "N" is determined in step S430, or after step S450.

The work information table 600 includes an ID field 605, a work date and time field 610, a worker field 615, an equipment image before work field 620, an equipment image after work completion field 625, a content of work performed field 630, a comparison result before/after work field 635, an equipment image after reinstallation field 640, and a detailed reinstallation location field 645. The ID field 605 stores an ID of a unit of work. The work date and time field 610 stores the date and time when the work is performed. The worker field 615 stores the worker who has performed the work. The equipment image before work field 620 stores an image of the equipment taken before the work, which is an image taken the previous time work was performed. The equipment image after work completion field 625 stores an image of the equipment taken after the work is completed, which is an image taken when the current work is performed. The content of work performed field 630 stores details about the work performed. The comparison result before/after work field 635 stores the result of a comparison between the images taken before the work and after the completion of the work. The equipment image after reinstallation field 640 stores an image of the equipment after reinstallation. The detailed reinstallation location field 645 stores details about the reinstallation location. The data stored in the detailed reinstallation location field 645 may be coordinates on a map of the region where the equipment is installed, for example.

For example, on the first row of the work information table 600, the ID is "0001", the work date and time is "2020/03/03 15:05", the worker is "A", there is an image of the equipment before the work and an image of the equipment after the completion of the work, the content of the work performed is "abcdef", the result of the comparison before and after the work is "different", there is no image of the equipment after reinstallation, and the detailed reinstallation location is "3F Room #X, north side" with a "MAP02". On the second row, the ID is "0002", the work date and time is "2020/03/03 15:15", the worker is "A", there is an image of the equipment before the work and an image of the equipment after the completion of the work, the content of the work performed is "ghijkl", the result of the comparison before and after the work is "different", there is an image of the equipment after reinstallation, and the detailed reinstallation location is "-". The equipment on the first row is equipment for which strictness of the installation position is not demanded, and even though the comparison result before/after work field 635 is "different", the different installation position is accepted. However, the location of the installation position is corrected on the map, and the corrected position is stored in the detailed reinstallation location field 645. Thereafter, if the equipment is worked on again, the reinstallation location is reflected in the detailed installation location field 525 of the work target information table 500. The equipment on the second row is equipment for which strictness of the installation position is demanded, and because the comparison result before/after work field 635 is "different", the equipment is reinstalled, and an image of the reinstalled state of the equipment is stored in the equipment image after reinstallation field 640. Note that reinstallation is repeated until the image of the equipment taken after the completion of the work matches the image of the equipment taken before the work, and the matching image is stored.

Figure 7:
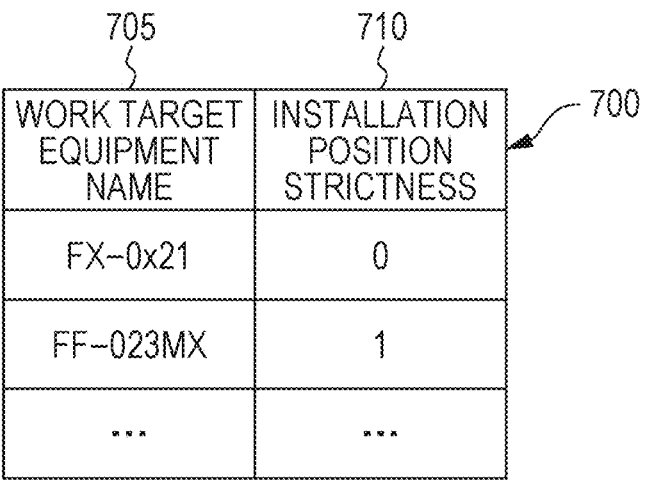
FIG. 7 is an explanatory diagram illustrating an exemplary data structure of an installation position strictness table.

FIG. 7 is an explanatory diagram illustrating an exemplary data structure of the installation position strictness table 700.

The installation position strictness table 700 includes a work target equipment name field 705 and an installation position strictness field 710. The work target equipment name field 705 stores the equipment name (type) of the equipment to be worked on. The installation position strictness field 710 stores the strictness of the installation position for the equipment. Note that in the installation position strictness field 710, "0" indicates that strictness of the installation position is not demanded, whereas "1" indicates that strictness of the installation position is demanded.

Equipment for which strictness of the installation position is not demanded mostly refers to equipment acquiring data that is unaffected or only slightly affected even if the equipment is displaced somewhat. Examples of such equipment include temperature/humidity sensors, weight sensors (used for inventory management and the like), illuminance sensors (used to detect whether the lights in a room are on or off), acceleration sensors, and magnetic sensors.

Equipment for which strictness of the installation position is demanded refers to equipment having a precise installation position, detection direction, or the like. Examples of such equipment include human sensors, sensors for detecting the opening or closing of a door, image detectors such as network cameras, authentication-related sensors (for which an abnormal position may influence the authentication accuracy or usability), power sensors (such as sensors that check the current flowing through a specific cord), and vibration sensors (for detecting malfunctions and failures).

For example, the first row of the installation position strictness table 700 indicates that strictness of the installation position is not demanded for the equipment "FX-0x21", or in other words, that the position after reinstallation is still accepted even if different from the previous installation position. As illustrated in the example of the work target information table 500, "FX-0x21" measures temperature, and therefore strictness of the installation position is not demanded.

On the other hand, the second row of the installation position strictness table 700 indicates that strictness of the installation position is demanded for the equipment "FF-023MX", or in other words, that the position after reinstallation is demanded to be the same as the previous installation position. As illustrated in the example of the work target information table 500, "FF-023MX" is a human sensor that detects whether or not a human is present at a certain position, and therefore strictness of the installation position is demanded.

A usage scenario will be described.

IoT is becoming more widespread, and various sensors are starting to be installed in all kinds of places (that is, IoT devices are becoming ubiquitous). Consequently, work for not only maintaining specific equipment but also maintaining various IoT devices and the like has increased.

In the case where the information processing device 100 is not used, problems like the following may occur.

Because the person who installs a piece of equipment and the person who performs maintenance work or the like on the equipment are not necessarily the same person, finding the equipment to work on may be challenging. In particular, because GPS may be unavailable (or the GPS precision may be insufficient) for equipment installed indoors, it may be difficult to specify the position of the installed equipment and also specify the position of the worker, which makes finding the equipment to work on even more difficult.

Hereinafter, an example of working on equipment installed indoors will be described with reference to the examples illustrated in the drawings from FIG. 8. Note that as described above, the present disclosure is not only applicable to indoor equipment, but also to outdoor equipment.

Figure 8:
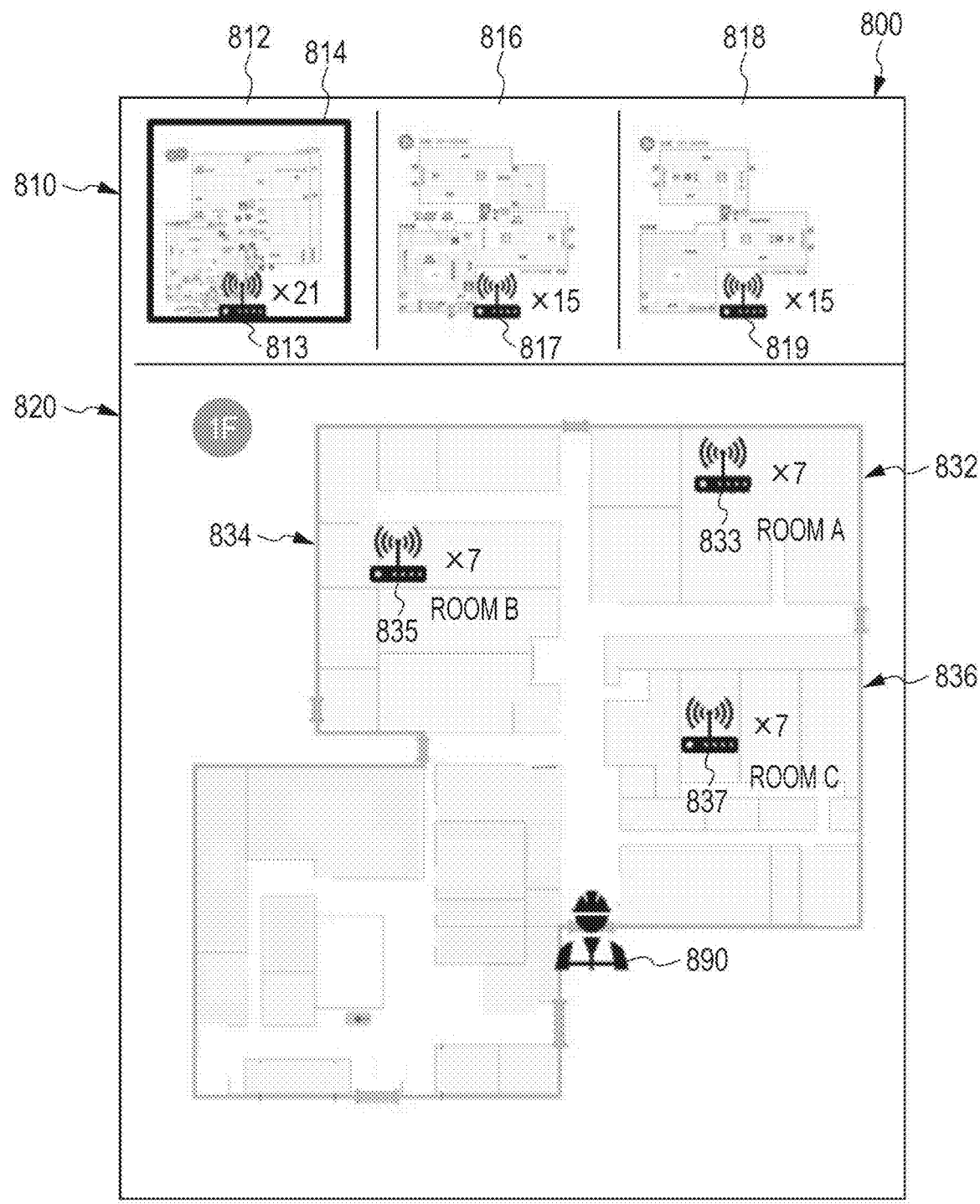
FIG. 8 is an explanatory diagram illustrating an exemplary display according to the exemplary embodiment.

FIG. 8 is an explanatory diagram illustrating an exemplary display according to the exemplary embodiment. FIG.

8 illustrates an example of a display presented by the process in step S408 of the flowchart illustrated in the example of FIGS. 4A and 4B.

When the worker 250 arrives at the location where the equipment to work on is installed, map information about the building of the target is displayed on the user terminal 200 (or user terminal 210) such as a tablet. The worker 250 confirms that he or she is at the entrance to the building, and taps the map to transmit position information about him- or herself. The tap is a notification indicating that the worker 250 has entered the building.

For example, a floor indication area 810 and a floor map display area 820 are displayed on a screen 800. In the floor indication area 810, a first floor indication area 812, a second floor indication area 816, and a third floor indication area 818 for the floors of the building are displayed.

Additionally, the number of pieces of equipment to work on is displayed on each map. For example, in the first floor indication area 812, a target equipment display icon 813 is displayed to inform the worker 250 that there are 21 pieces of equipment to work on. In the second floor indication area 816, a target equipment display icon 817 is displayed to inform the worker 250 that there are 15 pieces of equipment to work on. In the third floor indication area 818, a target equipment display icon 819 is displayed to inform the worker 250 that there are 15 pieces of equipment to work on.

In the case where the first floor indication area 812 is selected, a selection frame 814 is displayed inside the first floor indication area 812, and additionally, a detailed map of the selected first floor is displayed in the floor map display area 820.

In a room A 832, a target equipment display icon 833 is displayed to inform the worker 250 that there are 7 pieces of equipment to work on in the room A. In a room B 834, a target equipment display icon 835 is displayed to inform the worker 250 that there are 7 pieces of equipment to work on in the room B. In a room C 836, a target equipment display icon 837 is displayed to inform the worker 250 that there are 7 pieces of equipment to work on in the room C.

Figure 9:
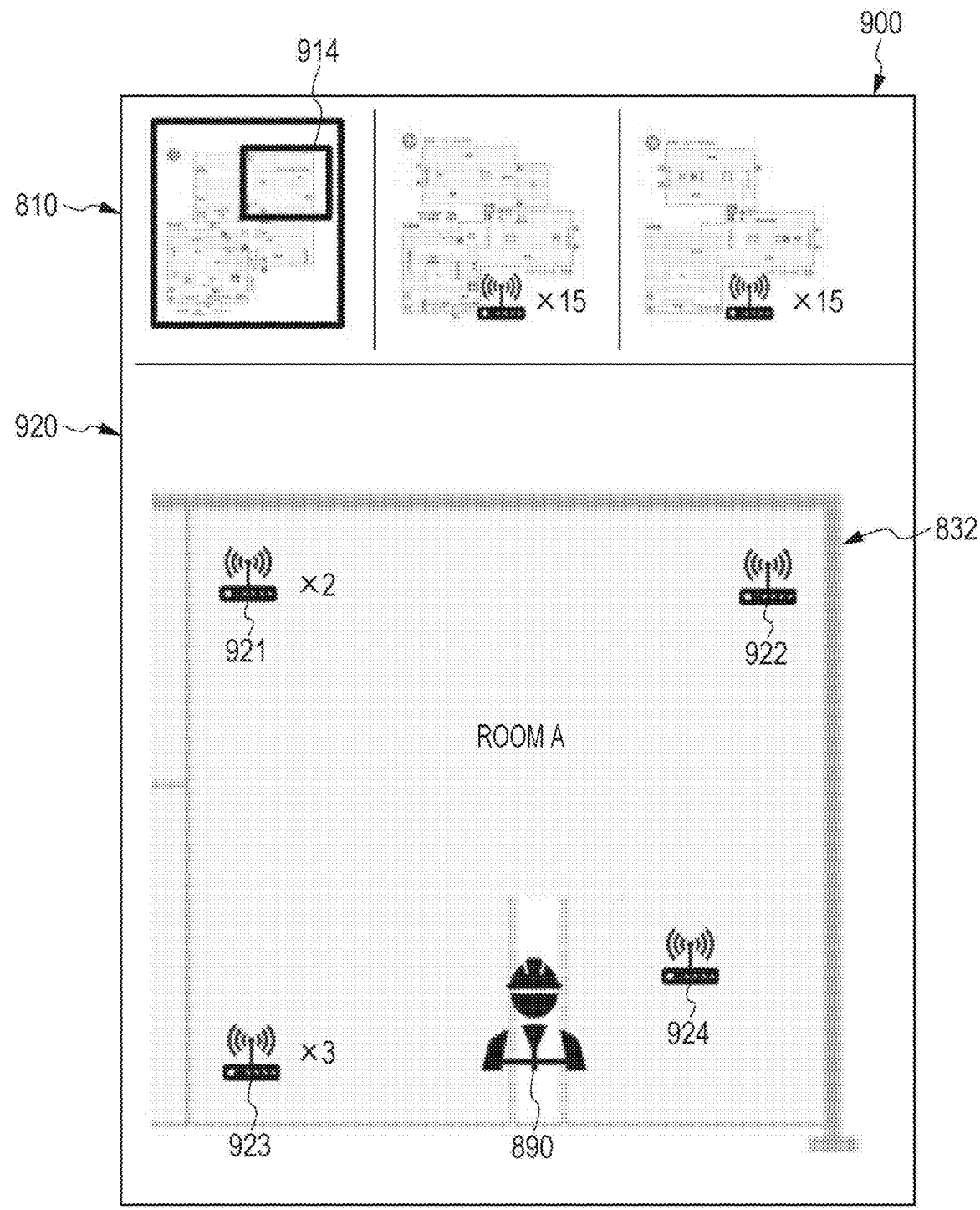
FIG. 9 is an explanatory diagram illustrating an exemplary display according to the exemplary embodiment.

FIG. 9 is an explanatory diagram illustrating an exemplary display according to the exemplary embodiment. FIG. 9 illustrates an example of a display presented by the process in step S410 of the flowchart illustrated in the example of FIGS. 4A and 4B.

Next, when the worker 250 arrives at a room (room A), the display of the room is enlarged, and the positions of the equipment to work on are displayed.

For example, the floor indication area 810 and a room map display area 920 are displayed on a screen 900. In the floor indication area 810, a display area 914 is additionally displayed in correspondence with the room being displayed in the room map display area 920.

In the room map display area 920, the room A 832 is displayed, and inside the room A 832, a target equipment display icon 921, a target equipment display icon 922, a target equipment display icon 923, a target equipment display icon 924, and a worker icon 890 are displayed. The display indicates that the equipment to work on that has been assigned to the worker 250 is installed at the positions of the target equipment display icons.

Figure 10:
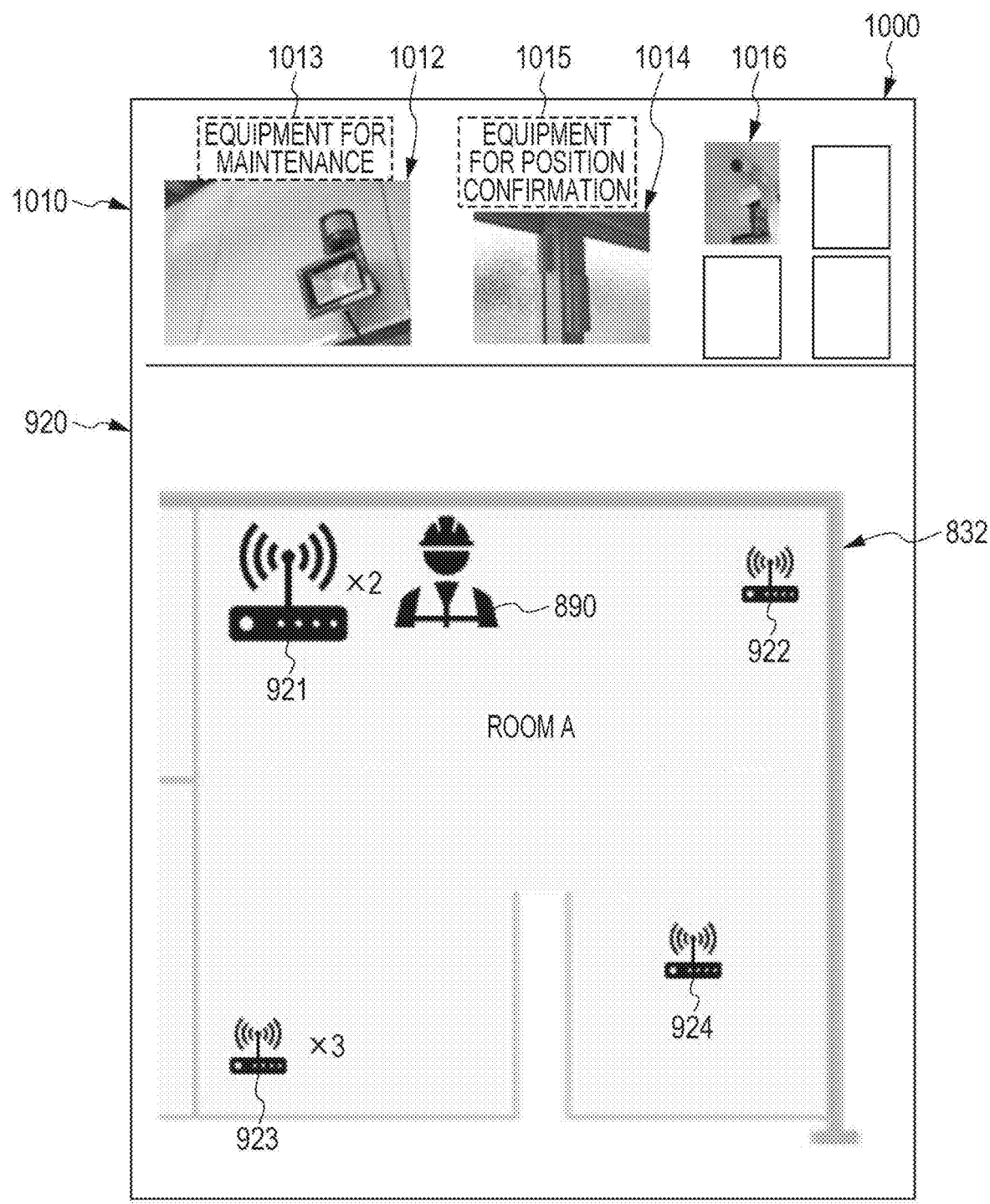
FIG. 10 is an explanatory diagram illustrating an exemplary display according to the exemplary embodiment.

FIG. 10 is an explanatory diagram illustrating an exemplary display according to the exemplary embodiment. FIG. 10 illustrates an example of a display presented by the process in step S412 of the flowchart illustrated in the example of FIGS. 4A and 4B.

The worker 250 selects (also referred to as tapping) one of the target equipment display icons being displayed in the room map display area 920, thereby causing an image of the equipment installed near the selected position to be displayed in a target equipment display area 1010.

For example, the target equipment display area 1010 and the room map display area 920 are displayed on a screen 1000. The worker 250 selects the target equipment display icon 921, thereby causing the target equipment display icon 921 to be redisplayed in a large size, the worker icon 890 to move close to the target equipment display icon 921, and a target equipment image 1012 and a target equipment image 1014 corresponding to the target equipment display icon 921 to be displayed in the target equipment display area 1010. By displaying an equipment for maintenance message 1013 near the target equipment image 1012 and an equipment for position confirmation message 1015 near the target equipment image 1014, the worker 250 is able to know whether the equipment is targeted for maintenance work or position confirmation. Additionally, a target equipment image 1016 is also displayed in the target equipment display area 1010, but this is not an image of equipment corresponding to the target equipment display icon 921, and is an image of equipment corresponding to the target equipment display icon 922 near the target equipment display icon 921. Consequently, the target equipment image 1016 is displayed smaller than the target equipment image 1012 and the target equipment image 1014.

Note that the images of equipment are displayed in the target equipment display area 1010, but may also be displayed inside the room A 832. In other words, in the case where the target equipment display icon 921 is selected, the target equipment image 1012 and the target equipment image 1014 may be displayed instead of the target equipment display icon 921.

Figure 11:
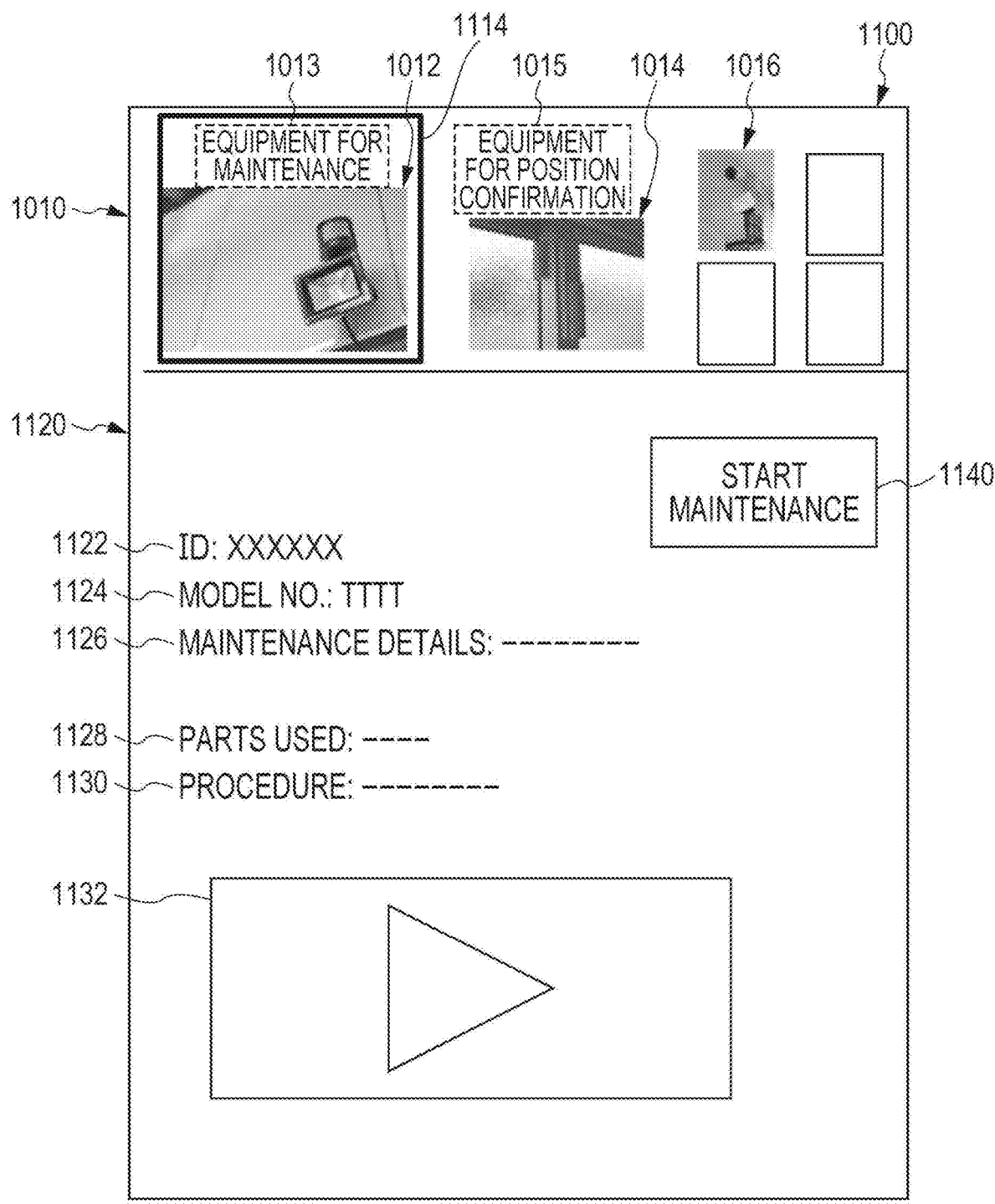
FIG. 11 is an explanatory diagram illustrating an exemplary display according to the exemplary embodiment.

FIG. 11 is an explanatory diagram illustrating an exemplary display according to the exemplary embodiment. FIG. 11 illustrates an example of a display presented by the processes in steps S414, S416, and S418 of the flowchart illustrated in the example of FIGS. 4A and 4B.

The worker 250 selects a target equipment image being displayed in the target equipment display area 1010, thereby causing work details related to the equipment corresponding to the selected image to be displayed in a maintenance work details display area 1120.

For example, the target equipment display area 1010 and the maintenance work details display area 1120 are displayed on a screen 1100. In the case where the target equipment image 1012 in the target equipment display area 1010 is selected, a selection frame 1114 indicating the selection is displayed enclosing the target equipment image 1012.

Additionally, details about the maintenance work related to the equipment corresponding to the selected target equipment image 1012 are displayed in the maintenance work details display area 1120. Specifically, an ID field 1122 indicating an ID of the work, a model number field 1124 indicating a model number of the equipment, a maintenance details field 1126 indicating details about the current maintenance work to be performed on the equipment, a parts used field 1128 indicating parts used in the maintenance work on the equipment (such as replacement parts and adjusting tools, for example), a procedure field 1130 that uses text to indicate the procedure of the maintenance work, a maintenance procedure video display area 1132 that uses video to indicate the procedure of the maintenance work, and a Start Maintenance button 1140 are displayed in the maintenance work details display area 1120.

For example, the worker 250 selects the maintenance procedure video display area 1132, and after watching the video of the maintenance work, the worker 250 selects the Start Maintenance button 1140 and performs maintenance work on the target equipment. In the case where the Start Maintenance button 1140 is selected by the worker 250, "Y" is determined in step S420 of the flowchart illustrated in the example of FIGS. 4A and 4B.

Figure 12:
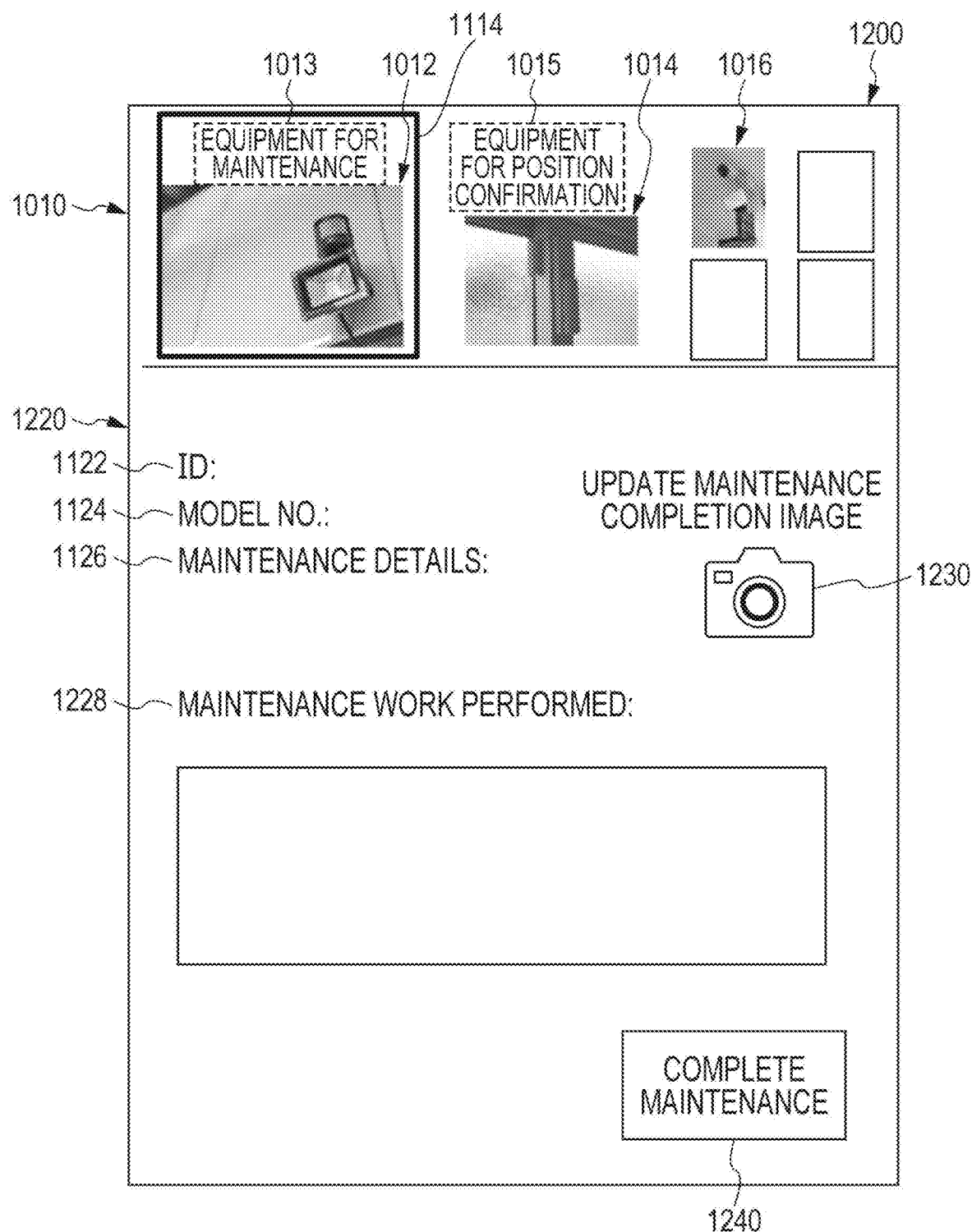
FIG. 12 is an explanatory diagram illustrating an exemplary display according to the exemplary embodiment.

FIG. 12 is an explanatory diagram illustrating an exemplary display according to the exemplary embodiment. FIG. 12 illustrates an example of a display presented by the process in step S424 of the flowchart illustrated in the example of FIGS. 4A and 4B.

In the case where the Start Maintenance button 1140 is selected by the worker 250, the display changes to a screen 1200.

For example, the target equipment display area 1010 and a maintenance work report area 1220 are displayed on the screen 1200.

The ID field 1122, the model number field 1124, the maintenance details field 1126, a maintenance work performed field 1228, an imaging instruction icon 1230, and a Complete Maintenance button 1240 are displayed in the maintenance work report area 1220. When the maintenance is completed, the worker 250 inputs work details as text into the frame of the maintenance work performed field 1228. Additionally, the worker 250 selects the imaging instruction icon 1230 to activate an imaging mode, and uses the camera function of the user terminal 200 (or user terminal 210) to take an image of the targeted equipment. Thereafter, the worker 250 selects the Complete Maintenance button 1240.

In the case where the Complete Maintenance button 1240 is selected, the target equipment image 1012 is removed from the target equipment display area 1010. Note that this example illustrates a case where "N" is determined in step S430 of the flowchart illustrated in the example of FIGS. 4A and 4B. In other words, an exemplary process is illustrated for the case where the image of the equipment taken before the maintenance work is performed and the image of the equipment taken after the maintenance work is performed are compared, the images are determined to be matching, and the work is determined to be complete.

Figure 13:
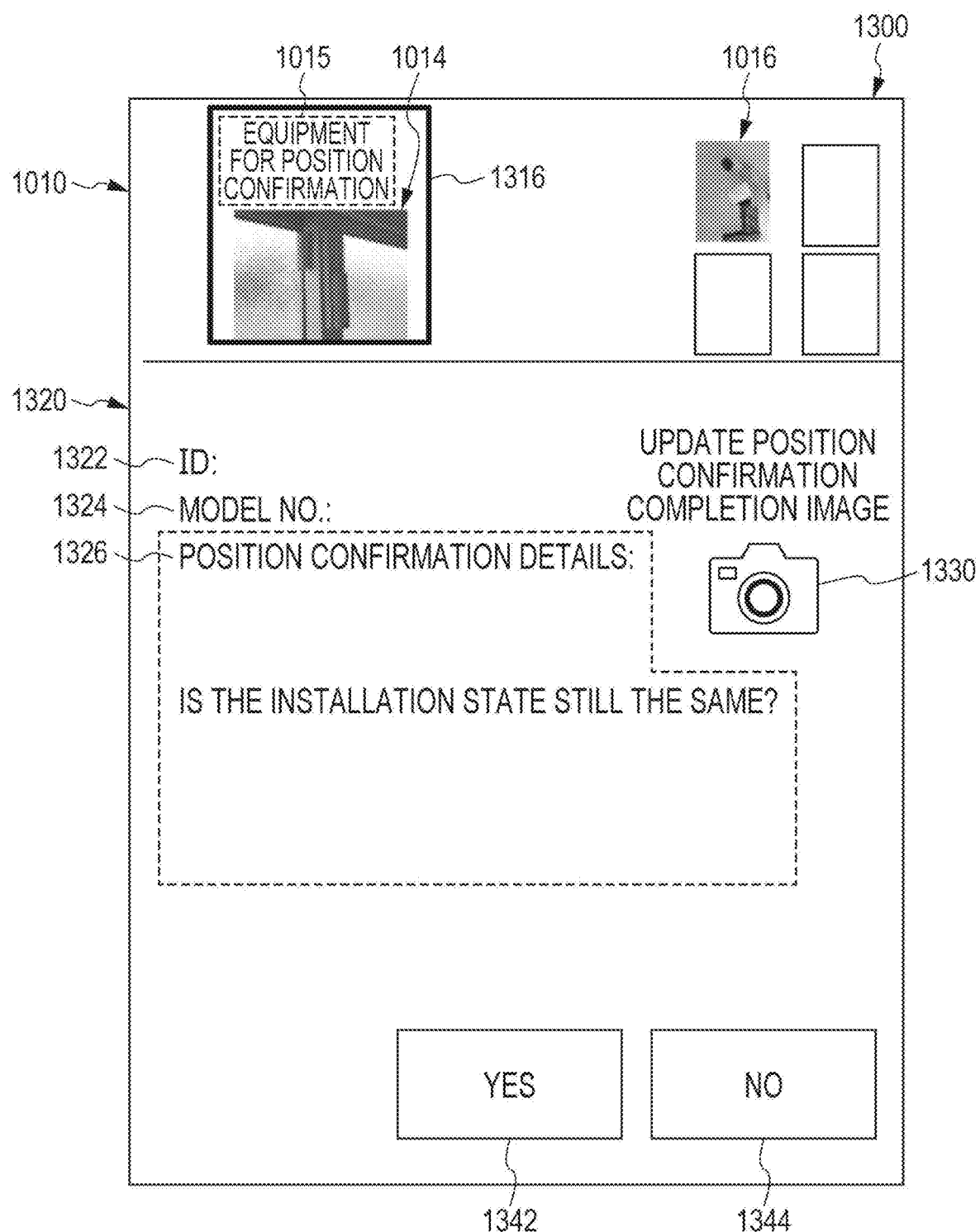
FIG. 13 is an explanatory diagram illustrating an exemplary display according to the exemplary embodiment.

FIG. 13 is an explanatory diagram illustrating an exemplary display according to the exemplary embodiment. FIG. 13 illustrates an example of a display presented by the processes in steps S446 and S448 of the flowchart illustrated in the example of FIGS. 4A and 4B. In other words, of the two types of work (maintenance work and confirmation work), FIG. 13 illustrates an exemplary display for the work of confirming that equipment is installed.

For example, the target equipment display area 1010 and a position confirmation work display area 1320 are displayed on a screen 1300.

In the case where the target equipment image 1014 is selected by the worker 250, the display changes to the screen 1300. Additionally, the target equipment image 1014 is displayed enclosed by a selection frame 1316 indicating the selection.

An ID field 1322, a model number field 1324, a position confirmation details field 1326, an imaging instruction icon 1330, a Yes button 1342, and a No button 1344 are displayed in the position confirmation work display area 1320. In the position confirmation details field 1326, confirmation details such as "Is the installation state still the same?" are displayed, for example. Additionally, the worker 250 selects the imaging instruction icon 1330 to activate an imaging mode, and uses the camera function of the user terminal 200 (or user terminal 210) to take an image of the targeted equipment. Thereafter, the worker 250 selects the Yes button 1342 (in the case where the installation state is still the same) or the No button 1344 (in the case where the installation state has changed).

Figure 14:
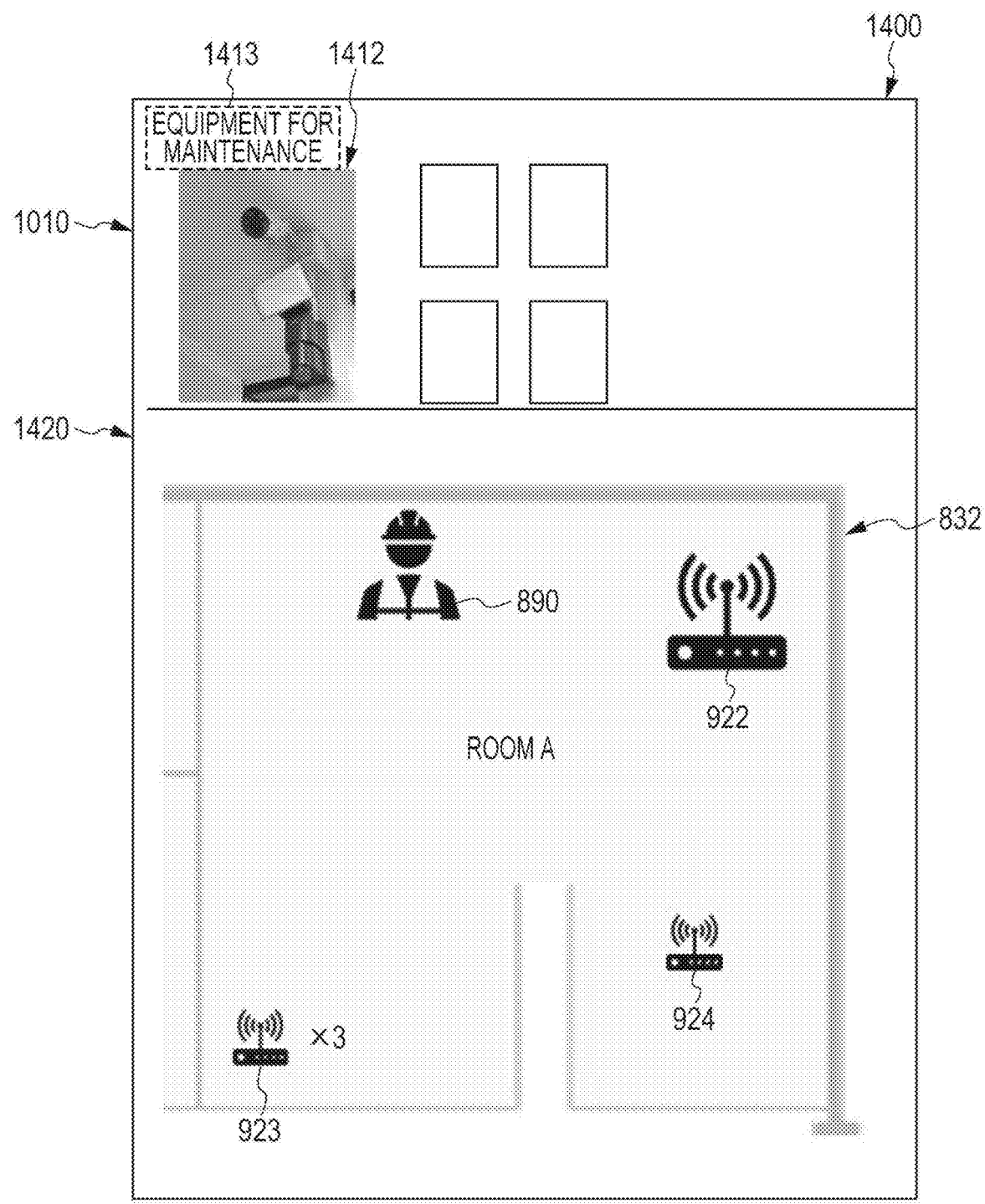
FIG. 14 is an explanatory diagram illustrating an exemplary display according to the exemplary embodiment.

FIG. 14 is an explanatory diagram illustrating an exemplary display according to the exemplary embodiment.

After the work on the two pieces of equipment described above (the equipment corresponding to the target equipment image 1012 and the target equipment image 1014) is completed, a target equipment image 1412 is displayed in the target equipment display area 1010. The target equipment image 1412 is an enlarged display of the target equipment image 1016 illustrated in the example of FIG. 10. In other words, an image of equipment to work on at a position near the worker 250 is displayed. In other words, the target equipment image 1412 is an image of the equipment corresponding to the target equipment display icon 922.

The target equipment display area 1010 and a room map display area 1420 are displayed on a screen 1400.

Because the work with respect to the target equipment display icon 921 is completed, the target equipment display icon 921 is removed from the room A 832 in the room map display area 1420 compared to the room map display area 920 illustrated in the example of FIG. 10.

Additionally, the target equipment display icon 922 near the worker icon 890 is displayed in a large size, and the target equipment image 1412 is displayed in a large size in the target equipment display area 1010. The worker 250 is able to start work on nearby equipment.

Figure 15:
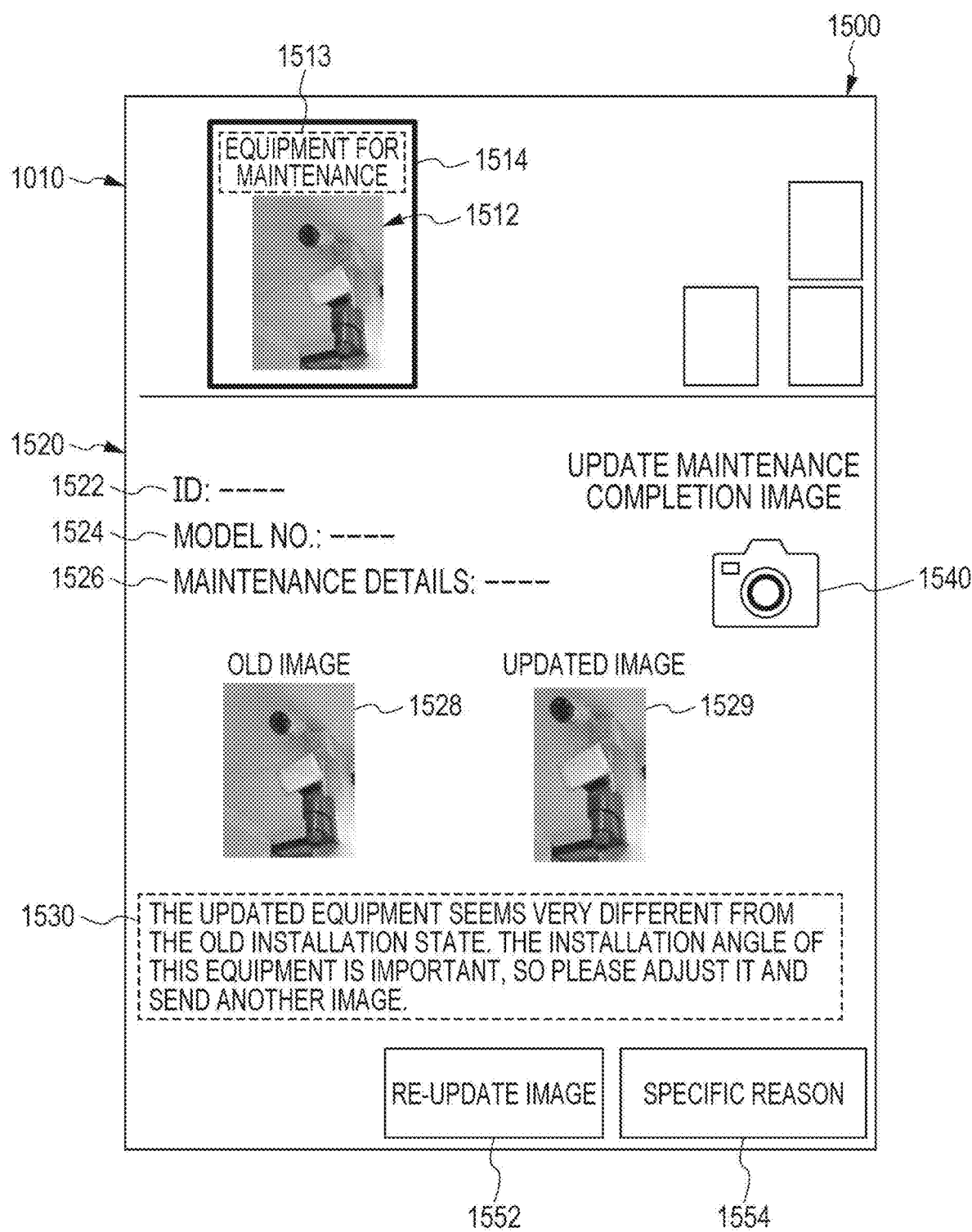
FIG. 15 is an explanatory diagram illustrating an exemplary display according to the exemplary embodiment.

FIG. 15 is an explanatory diagram illustrating an exemplary display according to the exemplary embodiment. FIG. 15 illustrates an example of a display presented by the process in step S436 of the flowchart illustrated in the example of FIGS. 4A and 4B. In other words, FIG. 15 illustrates an exemplary display for the case where the image taken before the work and the image taken after the work are different, and therefore the work is determined to be incomplete and a reinstallation instruction is given.

The target equipment display area 1010 and a reinstallation instruction display area 1520 are displayed on a screen 1500. The display in the target equipment display area 1010 is a state in which a target equipment image 1512 has been selected by the worker 250 as the work target.

An ID field 1522, a model number field 1524, a maintenance details field 1526, an old image 1528, an updated image 1529, a comment display area 1530, an imaging instruction icon 1540, a Re-update Image button 1552, and a Specific Reason button 1554 are displayed in the reinstallation instruction display area 1520.

In the case where the work is determined to be incomplete as a result of comparing the old image 1528 and the updated image 1529, a message such as "The updated equipment seems very different from the old installation state. The installation angle of this equipment is important, so please adjust it and send another image." is displayed in the comment display area 1530, for example. The installation work is performed again by the worker 250, an image of the equipment is taken again, and the Re-update Image button 1552 is selected. If the work is determined to be complete, the updated image 1529 is stored as the image taken after the work and is displayed the next time work is performed. Note that in cases where the installation position of the equipment is unavoidably changed because the equipment environment is different, such as when the position of a shelf used for installation is different than before, for example, the Specific Reason button 1554 is selected. With this arrangement, the work is considered to be complete. Also, in the case where the Specific Reason button 1554 is selected, the display may be changed to a help screen or a report screen for contacting an administrator (in this case, the administrator includes the person in charge of the equipment), for example. "Changing to a report screen for contacting an administrator" means, after the work by the worker 250 (specifically, when the Specific Reason button 1554 is selected), presenting a screen for reporting to the administrator of the equipment in the case where the installation position of the equipment has changed. Here, "after the work by the worker 250" modifies "presenting a screen", and the screen is presented after the work by the worker 250. Also, the reason why the installation position of the target equipment has unavoidably changed is input by the worker 250 on the "screen for reporting". Thereafter, the administrator of the equipment is notified of the input content. The notification may be an email message, a message posted on a social network service (SNS), or the like.

Figure 16:
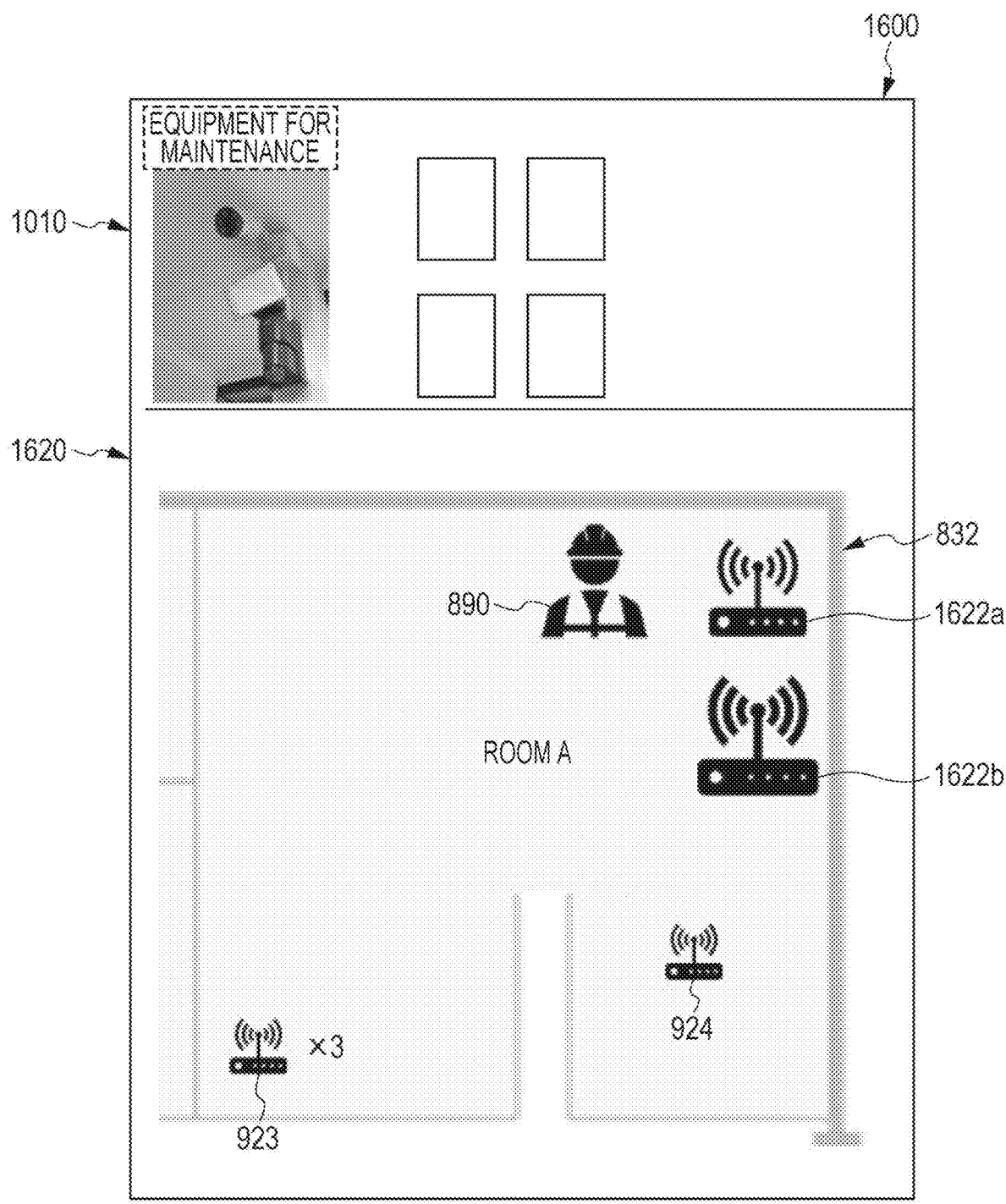
FIG. 16 is an explanatory diagram illustrating an exemplary display according to the exemplary embodiment.

FIG. 16 is an explanatory diagram illustrating an exemplary display according to the exemplary embodiment. FIG. 16 illustrates an example of a display presented by the processes in steps S440 and S442 of the flowchart illustrated in the example of FIGS. 4A and 4B. In other words, in the case where strictness of the installation position of the equipment is not demanded and the installation position is changed, the worker 250 is encouraged to correct the position of the equipment on the map.

The target equipment display area 1010 and a room map display area 1620 are displayed on a screen 1600.

The room A 832 is displayed in the room map display area 1620, and inside the room A 832, the worker icon 890, a target equipment display icon (before maintenance) 1622*a*, target equipment display icon (after maintenance) 1622*b*, a the target equipment display icon 923, and the target equipment display icon 924 are displayed.

Because the worker 250 has moved the installation position of the equipment, the worker 250 performs an operation of moving the target equipment display icon (before maintenance) 1622*a* at the position before the work to target equipment display icon (after maintenance) 1622*b* at the position after the work on the map of the room A 832. After that, when work is performed the next time, the target equipment display icon will be displayed at the position of the target equipment display icon (after maintenance) 1622*b*.

Note that the exemplary embodiments may also be modified as follows.

Appearance of Display of Installed Equipment

The equipment may also be displayed in order of proximity to the worker 250.

The equipment may also be displayed to distinguish between equipment to work on and the equipment not to work on. For example, an image of equipment to work on may be displayed relatively larger, while an image of other equipment may be displayed relatively smaller. Additionally, the display of equipment may be distinguished by color. For example, a frame surrounding an image of equipment to work on may be red, while a frame surrounding an image of other equipment may be blue.

It may also be configured such that only the equipment scheduled to be worked on that day is displayed. Also, equipment for which the work deadline has passed or the work deadline is soon may be displayed in an emphasized way.

To make the user interface less cluttered, it may also be configured such that only the target equipment of the person responsible for performing the work is displayed.

As described above, depending on factors such as the qualifications of the worker 250, for a given piece of equipment there may be persons qualified to work on the equipment and persons not qualified to work on the equipment. Consequently, even in the case where work is to be performed on the equipment, the equipment may not be displayed as a work target if the worker (the logged-in user) is inappropriate for performing the work, and an icon for position confirmation may also be rendered invisible.

Security

An image of the installed state of the equipment may also be saved in the equipment itself, and the image may be transmitted in the case where the worker 250 is nearby. The "case where the worker 250 is nearby" may be determined to be true if wireless communication between the information processing device 100 and the equipment is successful, for example. This is because in such a case, the worker 250 is present at a distance close enough for the wireless communication to be successful.

Note that the described program may be provided stored in a recording medium, but the program may also be provided via a communication medium. In this case, a computer-readable recording medium storing a program, for example, may also be taken to be an exemplary embodiment of the present disclosure with respect to the described program.

A "computer-readable recording medium storing a program" refers to a computer-readable recording medium upon which a program is recorded, and which is used in order to install, execute, and distribute the program, for example.

Note that the recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a memory; and
one or a plurality of processors,
the processor being configured to
control a display device to display a map and an image of an equipment according to a user,
control, in a case where the image is selected, the display device to display information related to work to be performed on the equipment in the image,
request, in a case where the work is finished, the user to take an image of an installed state of the equipment, and cause the memory to store the taken image,
compare an image taken before the work is performed by the user to the image taken after the work is performed to determine whether a position of the equipment is different and whether the equipment is a predetermined type of equipment,
in a case where the position of the equipment is different and the equipment is the predetermined type of equipment, control the display device to display a warning about an installation position of the equipment and request the user to install the equipment again according to the installation position, and
in a case where the position of the equipment is different and the equipment is not the predetermined type of equipment, request the user to indicate the position where the equipment is installed on the map.

2. The information processing device according to claim 1, wherein
the processor is configured to
control to differentiate a display appearance of an image of equipment corresponding to the user from a display appearance of an image of equipment not corresponding to the user.

3. The information processing device according to claim 1, wherein
the processor is configured to
control to differentiate a display appearance of an image of equipment targeted for work currently from a display appearance of an image of equipment not targeted for work currently.

4. The information processing device according to claim 1, wherein
the processor is configured to
present, after the work by the user, a screen for reporting to an administrator of the equipment in a case where an installation position of the equipment has changed.

5. The information processing device according to claim 1, wherein
the processor is configured to
present, after the work by the user, a screen for reporting to an administrator of the equipment in a case where an installation position of the equipment has changed.

6. The information processing device according to claim 1, wherein
the processor is configured to
request the user to install the equipment again in a case where the equipment is a predetermined type of equipment and the work is incomplete.

7. The information processing device according to claim 1, wherein
the processor is configured to
request the user to indicate the position where the equipment is installed on the map in a case where the equipment is not a predetermined type of equipment and the position where the equipment is installed has become a different position.

8. The information processing device according to claim 1, wherein the predetermined type corresponds to a type of equipment for which strictness of an installation position is demanded.

9. A non-transitory computer readable medium storing a program causing a computer provided with a memory and one or a plurality of processors to execute a process for processing information,
the process comprising:
controlling a display device to display a map and an image of an equipment according to a user,
controlling, in a case where the image is selected, the display device to display information related to work to be performed on the equipment in the image, and
requesting, in a case where the work is finished, the user to take an image of an installed state of the equipment, and causing the memory to store the taken image,
comparing an image taken before the work is performed by the user to the image taken after the work is performed to determine whether a position of the equipment is different and whether the equipment is a predetermined type of equipment,
in a case where the position of the equipment is different and the equipment is the predetermined type of equipment, controlling the display device to display a warning about an installation position of the equipment and request the user to install the equipment again according to the installation position, and
in a case where the position of the equipment is different and the equipment is not the predetermined type of equipment, requesting the user to indicate the position where the equipment is installed on the map.

10. The non-transitory computer readable medium according to claim 9, wherein the predetermined type corresponds to a type of equipment for which strictness of an installation position is demanded.

11. An information processing device comprising:
display device controlling means for controlling a display device to display a map and an image of an equipment according to a user, and in a case where the image is selected, controlling the display device to display information related to work to be performed on the equipment in the image; and
requesting means for requesting, in a case where the work is finished, the user to take an image of an installed state of the equipment, and causing the memory to store the taken image, wherein
the display device controlling means further compares an image taken before the work is performed by the user to the image taken after the work is performed to determine whether a position of the equipment is different and whether the equipment is a predetermined type of equipment,
in a case where the position of the equipment is different and the equipment is the predetermined type of equipment, the display device controlling means controls the display device to display a warning about an installation position of the equipment and request the user to install the equipment again according to the installation position, and
in a case where the position of the equipment is different and the equipment is not the predetermined type of equipment, the display device controlling means controls the display device to request the user to indicate the position where the equipment is installed on the map.

12. The information processing device according to claim 1, wherein the memory storing the map, information related to the equipment installed in a region indicated by the map, and a person who is to work on the equipment in association with each other.

13. The non-transitory computer readable medium according to claim 9, wherein the memory storing the map, information related to the equipment installed in a region indicated by the map, and a person who is to work on the equipment in association with each other.

14. The information processing device according to claim 11, wherein the memory storing the map, information related to the equipment installed in a region indicated by the map, and a person who is to work on the equipment in association with each other.

15. The information processing device according to claim 11, wherein the predetermined type corresponds to a type of equipment for which strictness of an installation position is demanded.

* * * * *